US010055252B2

(12) United States Patent
Kagami et al.

(10) Patent No.: US 10,055,252 B2
(45) Date of Patent: Aug. 21, 2018

(54) APPARATUS, SYSTEM AND METHOD FOR ESTIMATING DATA TRANSFER PERIODS FOR JOB SCHEDULING IN PARALLEL COMPUTING

(71) Applicant: FUJITSU LIMITED, Kawasaki-shi, Kanagawa (JP)

(72) Inventors: Takahiro Kagami, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 15/073,722

(22) Filed: Mar. 18, 2016

(65) Prior Publication Data

US 2016/0299795 A1    Oct. 13, 2016

(30) Foreign Application Priority Data

Apr. 9, 2015   (JP) ................ 2015-079665

(51) Int. Cl.
| | |
|---|---|
| *G06F 9/46* | (2006.01) |
| *G06F 9/455* | (2018.01) |
| *G06F 9/48* | (2006.01) |
| *G06F 9/50* | (2006.01) |

(52) U.S. Cl.
CPC .......... *G06F 9/4856* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 5,278,975 A | * | 1/1994 | Ishihata | G06F 15/8007 713/375 |
| 5,809,078 A | * | 9/1998 | Tani | H04L 49/90 365/194 |
| 6,612,760 B2 | * | 9/2003 | Ueda | G06K 15/00 400/70 |
| 6,986,139 B1 | * | 1/2006 | Kubo | G06F 9/505 709/223 |
| 2002/0021669 A1 | * | 2/2002 | Kunito | H04L 67/2823 370/235 |
| 2006/0031380 A1 | * | 2/2006 | Shinno | G06Q 10/10 709/213 |
| 2009/0292787 A1 | * | 11/2009 | Hosokawa | H04L 12/1886 709/206 |
| 2013/0142108 A1 | * | 6/2013 | Ji | H04L 45/00 370/315 |
| 2014/0226975 A1 | * | 8/2014 | Zhang | H04L 12/00 398/25 |

(Continued)

FOREIGN PATENT DOCUMENTS

| | | |
|---|---|---|
| JP | 6-187308 | 7/1994 |
| JP | 2010-182199 | 8/2010 |
| JP | 2011-186606 | 9/2011 |

*Primary Examiner* — Bradley Teets
(74) *Attorney, Agent, or Firm* — Fujitsu Patent Center

(57) ABSTRACT

A parallel computing control apparatus determines, among a plurality of nodes, relay nodes located on a path from a first node allocated to a job to a second node. The parallel computing control apparatus obtains an index value indicating a use state of resources in the relay nodes. The parallel computing control apparatus calculates an estimated value of a transfer period taken to transfer data on the job from the first node to the second node, on the basis of the index value and the memory usage of the job.

5 Claims, 17 Drawing Sheets

(56) References Cited

U.S. PATENT DOCUMENTS

| | | | |
|---|---|---|---|
| 2015/0058860 A1* | 2/2015 | Iwata | G06F 9/5011 718/104 |
| 2015/0095900 A1* | 4/2015 | McDonald | G06F 11/1433 717/170 |
| 2016/0013990 A1* | 1/2016 | Kulkarni | H04L 41/22 709/224 |
| 2016/0234071 A1* | 8/2016 | Nambiar | H04L 45/00 |

\* cited by examiner

JOB SWAPPING

CHECKPOINT RESTART: RESTART ON THE SAME NODES

CHECKPOINT RESTART: RESTART ON DIFFERENT NODES

MIGRATION

CONSTANT VALUE TABLE 123

| CONSTANT VALUE NAME | SET VALUE |
|---|---|
| RAM READ SPEED | 4000 MB/s |
| RAM WRITE SPEED | 4000 MB/s |
| HDD READ SPEED | 100 MB/s |
| HDD WRITE SPEED | 60 MB/s |
| IDEAL BANDWIDTH | 100 MB/s |

FIG. 11

REGRESSION ANALYSIS TABLE 124

| NODE UTILIZATION | AVERAGE LINK USAGE | LINK USAGE VARIANCE | HOP COUNT | JOB SIZE | MEMORY USAGE | TRANSFER PERIOD |
|---|---|---|---|---|---|---|
| 0.2 | 160 MB/s | 10000.51 (MB/s)$^2$ | 10 | 24 | 4096 MB | 65 SECONDS |
| ⋮ | ⋮ | ⋮ | ⋮ | ⋮ | ⋮ | ⋮ |

FIG. 12

COEFFICIENT TABLE 125

| COEFFICIENT NAME | CALCULATED VALUE |
| --- | --- |
| A (NODE UTILIZATION) | ... |
| B (AVERAGE LINK USAGE) | ... |
| C (LINK USAGE VARIANCE) | ... |
| D (HOP COUNT) | ... |
| E (JOB SIZE) | ... |

FIG. 13

APPARATUS, SYSTEM AND METHOD FOR ESTIMATING DATA TRANSFER PERIODS FOR JOB SCHEDULING IN PARALLEL COMPUTING

CROSS-REFERENCE TO RELATED APPLICATION

This application is based upon and claims the benefit of priority of the prior Japanese Patent Application No. 2015-079665, filed on Apr. 9, 2015, the entire contents of which are incorporated herein by reference.

FIELD

Embodiments discussed herein relate to a parallel computing control apparatus and a parallel computing system.

BACKGROUND

There is a parallel computing system that includes a plurality of nodes, which are physical computers, and an interconnected network that connects these nodes so as to communicate with each other. Various topologies, such as Mesh, Torus, Hypercube, or Tree, are usable for interconnected networks. An interconnected network connects a great number of nodes and allows the nodes to operate in parallel, thereby improving operating performance. A parallel computing system with high operating performance may be used for large-scale scientific computing, such as complex simulation.

When a job, which is a unit of execution, is submitted by a user, a parallel computing system allocates one or more nodes to the submitted job. The allocated nodes execute the program of the submitted job. In the case where a plurality of jobs are submitted, the parallel computing system performs job scheduling. The job scheduling is to allocate computing resources, which are specified by "node"×"time", to the plurality of jobs, thereby determining which nodes and what time to execute each job.

In this connection, there has been proposed a computer system for managing the memories of a plurality of nodes to which processes may be assigned. In the proposed computer system, when a node receives a request for generating a process, the node selects a page to be removed from its memory if the memory has no free area. If it is possible to move the selected page from the memory to another node, the node sends the page to the other node over a network. If it is not possible to move the selected page to any other node, however, the node moves the page to an external storage device of the node.

In addition, there has been proposed a job scheduling system for allocating processors to jobs. In this proposed job scheduling system, general scheduling is first performed. If the scheduling indicates that any processor is going to be idle at a certain time, the job scheduling system causes the idle processor to start a job that has not started, earlier than scheduled. If all processors become busy before the job that has started earlier is completed, the job scheduling system interrupts the job that has started earlier until any processor becomes idle. In addition, if the initially scheduled start time of the job that has started earlier than scheduled comes before the job is completed, the job scheduling system causes the processor allocated to the job in the general scheduling to take over the job.

Further, there has been proposed a computer system in which a process is temporarily interrupted with "checkpoint restart". The checkpoint restart is a technique that saves the state of a process running on a node, and later restarts the process from the saved state on the same node as or a different node from the node that executed the process before the interruption. The proposed computer system generates a node number conversion table indicating correspondences between logical node numbers and physical node numbers. When restarting the process, the computer system updates the node number conversion table, thereby making it possible to restart the job on a different node from before the interruption.

Please see, for example, Japanese Laid-open Patent Publication Nos. 06-187308, 2010-182199, and 2011-186606.

By the way, jobs need different numbers of nodes for execution and have different execution periods. Therefore, as a parallel computing system continues to operate, idle computing resources are fragmented in a resource space defined by "node"×"time". Specifically, idle computing resources are discrete in the time domain, and even if a new job is submitted, any computing resource may not have a sufficient continuous idle period for the expected execution period of the job. Therefore, the fragmented idle computing resources are not used, which leads to a low efficiency in the use of nodes.

On the other hand, there is considered a method of allowing interruptions of jobs and using computing resources fragmented in the time domain. For example, a parallel computing system uses a node to start a job, and when a start time for another job with higher priority approaches, causes the node to save data stored in a memory to a save area, such as an auxiliary storage device of the node, and then to temporarily stop the job. After the other job is complete, the parallel computing system causes the node to load the saved data to the memory and then to restart the job. Alternatively, for example, the parallel computing system causes the node to transfer the data stored in the memory to another node that has become idle and then causes the other node to restart the job.

As described above, the efficiency of the use of nodes in a parallel computing system may be increased by performing job scheduling involving job interruptions. However, if a schedule plan involving transfer of data on a job between nodes is considered, a problem arises in the accuracy in the estimation of transfer period. In the case where there is a node located between a transfer source node and a transfer destination node, a transfer period may greatly vary due to other jobs running on the node and communication of the node for the other jobs. Therefore, if a transfer period is estimated on the basis of static information such as hardware performance, it is likely that there causes a big error between the estimated transfer period and the actual transfer period.

In addition, a low accuracy in the estimation of transfer period prevents optimal scheduling, which makes it difficult to achieve highly efficient use of nodes. For example, assume that a parallel computing system determines on the basis of an estimated data transfer period and idle periods of other nodes that a transfer destination node has a sufficient idle period for the execution of a job, and determines to change the node allocation to the job. Despite this, if the actual transfer period is longer than estimated and therefore the transfer destination node does not have a sufficient idle period for the execution of the job, a job interruption frequently occurs and thus an actual efficiency of the use of nodes decreases. If it is recognized in advance that a transfer period is long, a schedule may be determined so as not to cause a change in the node allocation to the job. That is to say, the accuracy in the estimation of transfer period in the job scheduling affects the efficiency of the use of nodes.

SUMMARY

According to one aspect, there is provided a parallel computing control apparatus including: a communication interface which performs communication with a plurality of nodes, the plurality of nodes being connected over a network; and a processor which allocates one or more of the plurality of nodes to a job, wherein the processor determines, among the plurality of nodes, a relay node located on a path from a first node to a second node, the first node being allocated to the job, obtains an index value indicating a use state of resources in the relay node, and calculates an estimated value of a transfer period taken to transfer data on the job from the first node to the second node, based on the index value and a memory usage of the job.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a constant value table;

FIG. 12 illustrates an example of a regression analysis table;

FIG. 13 illustrates an example of a coefficient table;

DESCRIPTION OF EMBODIMENTS

Figure 1:
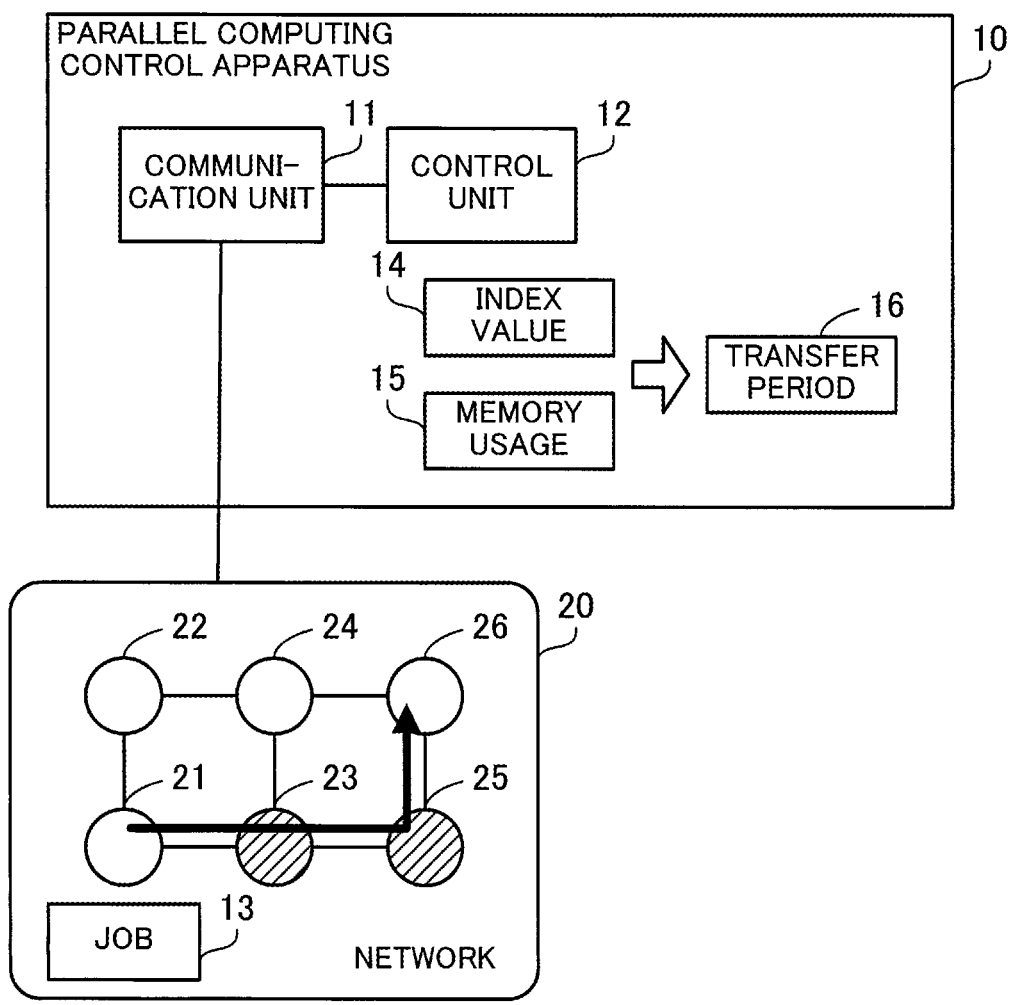
FIG. 1 illustrates a parallel computing system according to a first embodiment.

Several embodiments will be described below with reference to the accompanying drawings, wherein like reference numerals refer to like elements throughout.

(First Embodiment)

FIG. 1 illustrates a parallel computing system according to a first embodiment.

A parallel computing system of the first embodiment includes a parallel computing control apparatus 10 and nodes 21 to 26 connected over a network 20. The parallel computing control apparatus 10 performs job scheduling to allocate one or more of the nodes 21 to 26 to a job 13. The parallel computing control apparatus 10 may interrupt the job 13 during the execution of the job 13. The parallel computing control apparatus 10 may change the node allocation to the job 13 before and after the interruption of the job 13. In this case, data on the job 13 is transferred between nodes.

The nodes 21 to 26 are physical computers that are able to execute the process of the job 13. The nodes 21 to 26 are able to operate in parallel. The nodes allocated to the job 13 execute the process of the job 13, independently of the other nodes.

The network 20 is an interconnected network over which the nodes 21 to 26 are able to communicate with each other. For example, as the topology of the network 20, a direct network, such as Mesh, Torus, Hypercube, or Tree, is usable. The direct network is a topology where a plurality of nodes are connected directly without any communication-dedicated device, and each node is provided with a routing function. In the direct network, communication between two nodes may be relayed by other nodes located on a path therebetween.

The parallel computing control apparatus 10 includes a communication unit 11 and a control unit 12. The communication unit 11 communicates with the nodes 21 to 26. The communication unit 11 is a wired or wireless communication interface, for example. The control unit 12 performs job scheduling to allocate one or more of the nodes 21 to 26 to the job 13. As will be described later, when determining a schedule, the control unit 12 may estimate the time period taken to transfer data on the job 13.

In this connection, the parallel computing control apparatus 10 may be a computer. The control unit may be a Central Processing Unit (CPU), a Digital Signal Processor (DSP), or another processor. Further, the control unit 12 may include an Application Specific Integrated Circuit (ASIC), a Field Programmable Gate Array (FPGA), or other application-specific electronic circuits. A processor executes programs stored in a Random Access Memory (RAM) or another memory. The programs may include a migration period estimation program. A set of a plurality of processors (multiprocessor) may be called a "processor".

Assume now that the node 21 is allocated to the job 13 and that there is a schedule plan in which the node allocated to the job 13 is changed to the node 26, that is, the job 13 is moved (migrated) from the node 21 to the node 26. To determine whether to adopt this schedule plan, the control unit 12 estimates a transfer period 16 taken to transfer data on the job 13 from the node 21 to the node 26 in the following manner.

First, the control unit 12 determines, from the nodes 21 to 26, relay nodes that are located on a path from the transfer source node 21 to the transfer destination node 26. In the example of FIG. 1, the network 20 is a grid interconnected network, such as Mesh or Torus, and the nodes 23 and 25 are located on the path from the node 21 to the node 26. That is to say, in the case of transferring the data on the job 13 from the node 21 to the node 26, the data is relayed (routed) by the nodes 23 and 25. In the case of the grid intercommunication network, the control unit 12 is able to determine such relay nodes on the basis of the coordinates of a transfer source node and the coordinates of a transfer destination node, for example.

Then, the control unit 12 obtains an index value indicating the use state of resources in the relay nodes (nodes 23 and 25). For example, an index value indicating the use state of relay nodes executing other jobs, such as node utilization, may be used as the index value 14. Further, an index value indicating the use state of links used for other jobs running on relay nodes, such as link usage, may also be used as the index value 14. Still further, some kinds of index values may be used. The control unit 12 calculates the index value 14 on the basis of resource information that the parallel computing control apparatus 10 periodically collects from the nodes to 26. Alternatively, the control unit 12 may be designed to obtain the resource information from the relay nodes when estimating the transfer period 16.

Then, the control unit 12 calculates an estimated value of the transfer period 16 on the basis of the index value 14 and memory usage 15. The memory usage 15 is the size of a memory area used for the job 13 in the node 21, and is equal to or approximate to the amount of data to be transferred from the node 21 to the node 26. The control unit 12 extracts the memory usage 15 from the resource information that the parallel computing control apparatus 10 periodically collects from the nodes 21 to 26, for example. The transfer period 16 is calculated in the following manner, for example. The control unit 12 gives a weight to the index value 14 using a coefficient, to estimate a transfer bandwidth based on the current state of the relay nodes. Then, the control unit 12 calculates the estimated value of the transfer period 16 from the estimated transfer bandwidth and the memory usage 15.

In the case of using a coefficient for estimating the transfer period 16, an actual transfer period may be fed back to update the coefficient. For example, in the case where data is transferred from the node 21 to the node 26 after the transfer period 16 is estimated, the control unit 12 measures the actual transfer period. Then, the control unit 12 holds a set of the measured actual transfer period, index value 14, and memory usage 15 in a database. When such information is accumulated in the database, the control unit 12 performs regression analysis with the index value 14 as an explanatory variable (dependent variable), to thereby calculate the coefficient.

In the parallel computing system of the first embodiment, in order to determine whether to transfer data on the job 13 from the node 21 to the node 26, the relay nodes located on the path therebetween are determined, and then the index value 14 indicating the use state of resources in the relay nodes is obtained. Then, the transfer period 16 is estimated on the basis of the index value 14 and the memory usage 15 of the job 13.

Therefore, it is possible to calculate an estimated value of the transfer period 16 reflecting the state of the relay nodes that is expected when the data on the job 13 is transferred, and therefore to improve the accuracy in the estimation of the transfer period 16. For example, a high value is estimated as the transfer period 16 when relay nodes and their associated links are used a lot for other jobs, and a small value is estimated as the transfer period 16 when relay nodes and their associated links are used less.

As a result, it becomes possible to easily perform job scheduling so as to increase the efficiency of the use of the nodes 21 to 26. For example, the following is considered in view of an idle period of the transfer destination node 26: if a short transfer period 16 is estimated, a schedule plan involving data transfer is adopted; and if a long transfer period 16 is estimated, another schedule plan is considered. This approach makes it possible to avoid frequent interruptions of the job 13 and to increase the actual efficiency of the use of nodes.

(Second Embodiment)

Figure 2:
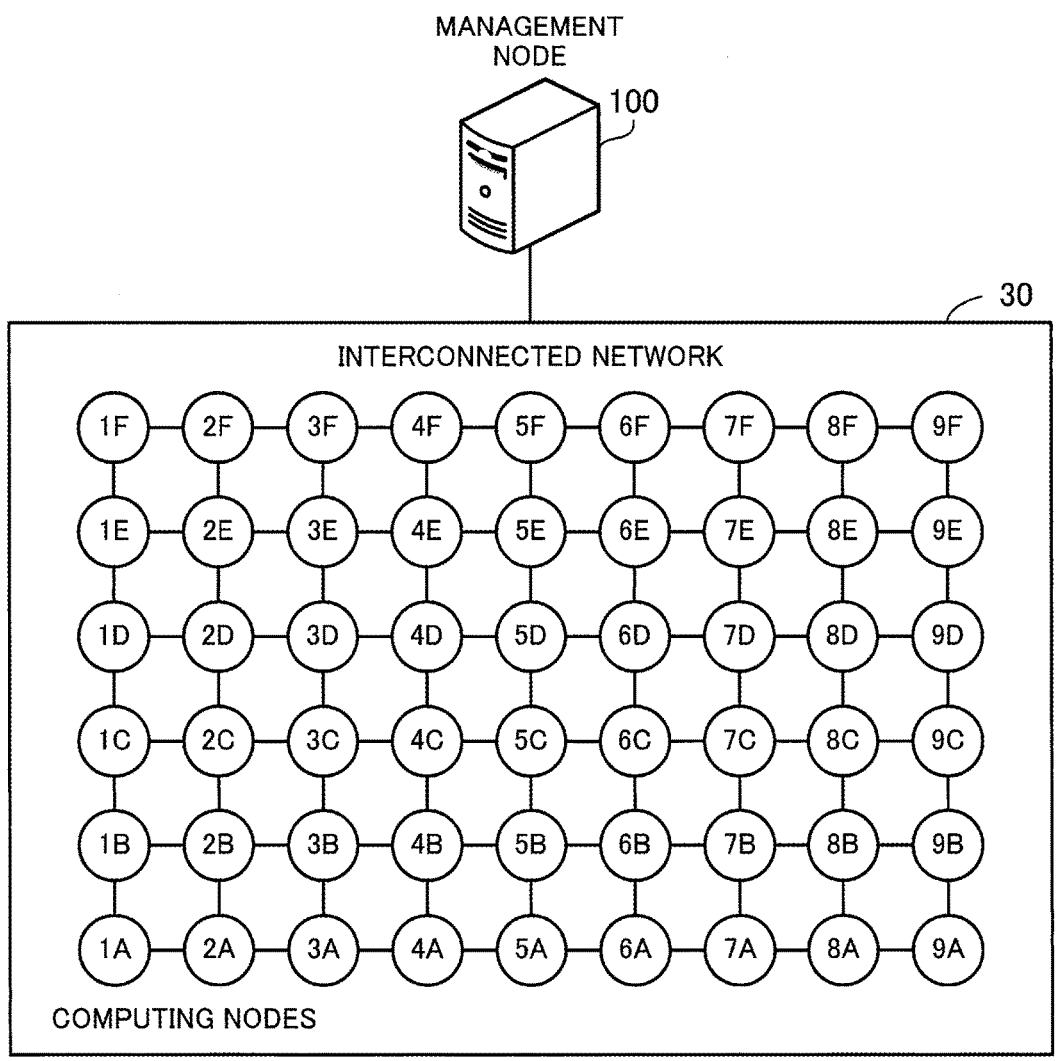
FIG. 2 illustrates a parallel computing system according to a second embodiment.

FIG. 2 illustrates a parallel computing system according to a second embodiment.

A parallel computing system of the second embodiment includes computing nodes 1A to 9A, 1B to 9B, . . . , and 1F to 9F, an interconnected network 30, and a management node 100.

The interconnected network 30 is a direct network where 9×6 computing nodes are connected in a Mesh topology. That is, in the interconnected network 30, adjacent computing nodes are directly connected with links, without any switch or communication-dedicated device. For example, the computing node 2B has a direct connection to the adjacent computing nodes 1B, 2A, 2C, and 3B. In the interconnected network 30, the location of each computing node is specified by two-dimensional coordinates. For example, the computing node 1A is specified by the coordinates (0, 0), the computing node 9A is specified by the coordinates (8, 0), the computing node 1F is specified by the coordinates (0, 5), and the computing node 9F is specified by the coordinates (8, 5).

The computing nodes 1A to 9A, 1B to 9B, . . . , and 1F to 9F are physical computers that are able to operate in parallel. Each of the computing nodes 1A to 9A, 1B to 9B, . . . , and 1F to 9F is provided with a job execution function of executing the processes of jobs and a routing function of relaying data. When a computing node communicates with another computing node, computing nodes located between these computing nodes relay data in a relay fashion. A destination computing node is specified by coordinates, for example. A routing algorithm may be that data is first transferred in a direction where the X coordinate approaches the destination and then the data is transferred in a direction where the Y coordinate approaches the destination. For example, data from the computing node 1A to the computing node 7D passes through the computing nodes 2A to 6A to reach the computing node 7A, and then passes through the computing nodes 7B and 7C to reach the computing node 7D.

The management node 100 is a server computer that manages the execution of jobs on the computing nodes 1A to 9A, 1B to 9B, . . . , and 1F to 9F. The management node 100 corresponds to the parallel computing control apparatus 10 of the first embodiment. The management node 100 sequentially accepts jobs submitted by one or more users. The management node 100 schedules the submitted jobs, and allocates computing resources, which are specified by "computing node"×"time", to the jobs. In this connection, the management node 100 is able to communicate with the computing nodes 1A to 9A, 1B to 9B, . . . , and 1F to 9F. For example, the management node 100 is connected to the computing nodes 1A to 9A, 1B to 9B, . . . , and 1F to 9F over a network used for management.

Figure 3:
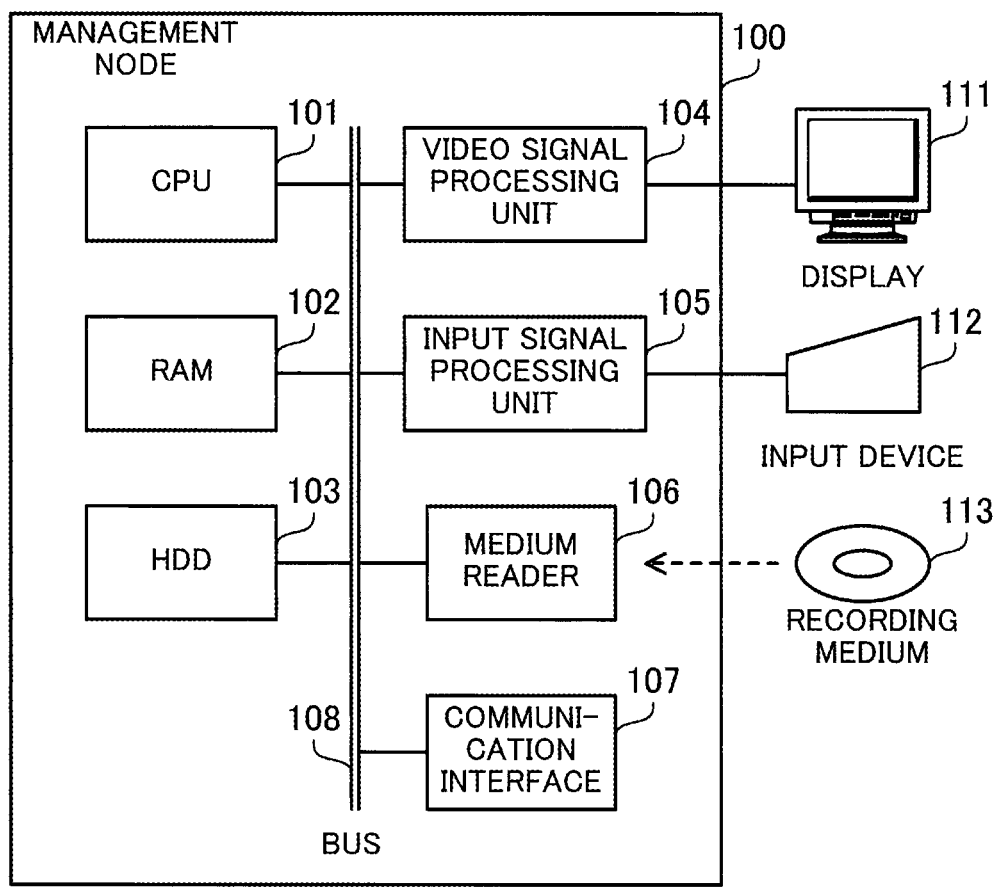
FIG. 3 is a block diagram illustrating an exemplary hardware configuration of a management node.

FIG. 3 is a block diagram illustrating an exemplary hardware configuration of a management node.

The management node 100 includes a CPU 101, a RAM 102, a Hard Disk Drive (HDD) 103, a video signal processing unit 104, an input signal processing unit 105, a medium reader 106, and a communication interface 107. These units are connected to a bus 108.

The CPU 101 is a processor including an operating circuit that executes instructions of programs. The CPU 101 loads at least part of a program or data from the HDD 103 to the RAM 102 and executes the loaded program. In this connection, the CPU 101 may include a plurality of processor cores. In addition, the management node 100 may include a plurality of processors. The management node 100 may execute processes, which will be described later, in parallel using a plurality of processors or processor cores. A set of plural processors (multiprocessor) may be called a "processor".

The RAM 102 is a volatile semiconductor memory that temporarily stores programs to be executed by the CPU 101 and data that is used while the CPU 101 operates. The management node 100 may be provided with another kind of memory than RAM or a plurality of memories.

The HDD 103 is a non-volatile storage device that stores programs including Operating System (OS), middleware, and application software, and data. The programs include a migration period estimation program. In this connection, the management node 100 may be provided with another kind of storage device, such as a flash memory or SSD, or a plurality of non-volatile storage devices.

The video signal processing unit 104 outputs images to a display 111 connected to the management node 100 in accordance with instructions from the CPU 101. As the display 111, a Cathode Ray Tube (CRT) display, a Liquid Crystal Display (LCD), a Plasma Display Panel (PDP), an Organic Electro-Luminescence (OEL) display, or anther may be used.

The input signal processing unit 105 receives input signals from an input device 112 connected to the management node 100, and outputs the input signals to the CPU 101. As the input device 112, a pointing device, such as a mouse, touch panel, touchpad, or trackball, a keyboard, a remote controller, or a button switch may be used. In addition, plural kinds of input devices may be connected to the management node 100.

The medium reader 106 is a reading device that reads programs and data from a recording medium 113. For example, as the recording medium 113, a magnetic disk, such as a Flexible Disk (FD) or an HDD, an optical disc, such as a Compact Disc (CD) or a Digital Versatile Disc (DVD), a Magneto-Optical disk (MO), a semiconductor memory, or another may be used. The medium reader 106 stores programs and data read from the recording medium 113 in the RAM 102 or HDD 103, for example.

The communication interface 107 communicates with the computing nodes 1A to 9A, 1B to 9B, . . . , and 1F to 9F. The communication interface 107 is a wired communication interface that is connected to a switch or another communication device with a cable, for example. In this connection, the communication interface 107 may be a wireless communication interface that is connected to an access point with a wireless link.

The management node 100 may be configured without the medium reader 106. Further, the management node 100 may be configured without the video signal processing unit 104 or the input signal processing unit 105 if the management node 100 is controlled from a user terminal device over a network. Still further, the display 111 and input device 112 may be integrated into the chassis of the management node 100. The computing nodes 1A to 9A, 1B to 9B, . . . , and 1F to 9F may be configured with the same hardware as the management node 100. In this connection, to directly connect to a plurality of adjacent computing nodes, the computing nodes 1A to 9A, 1B to 9B, . . . , and 1F to 9F each may be provided with a plurality of communication interfaces (four communication interfaces in the case of a two-dimensional Mesh topology).

The following describes allocation of computing nodes to a job.

Figure 4:
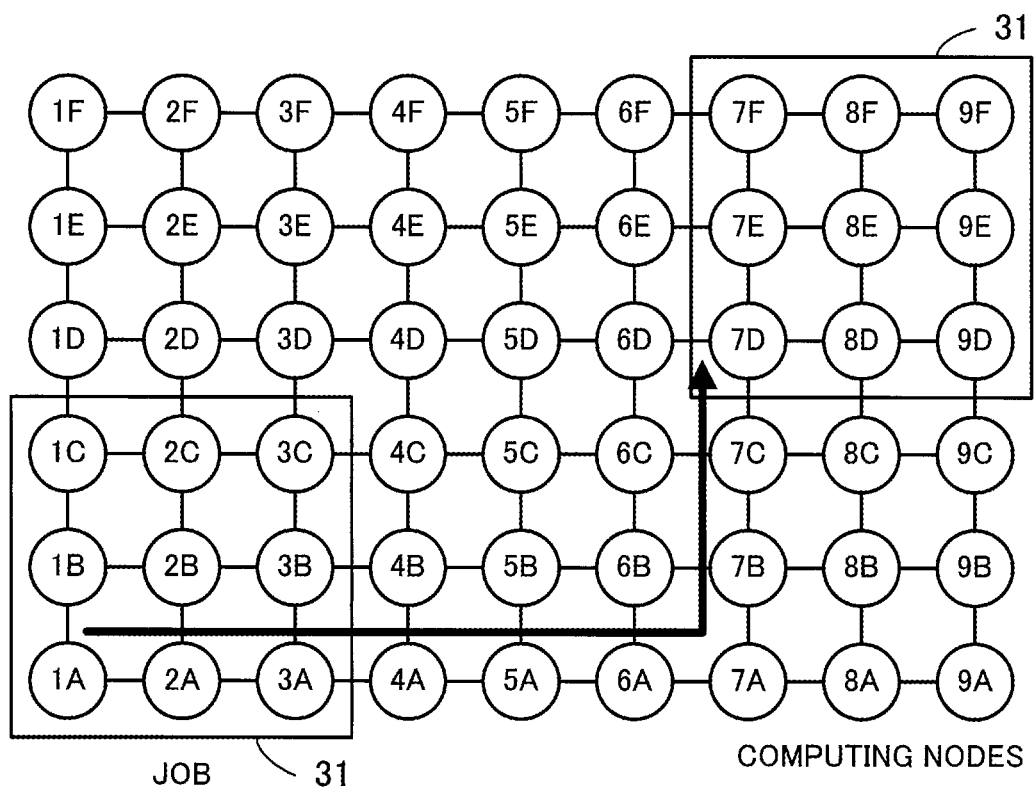
FIG. 4 illustrates an exemplary allocation of computing nodes to a job.

FIG. 4 illustrates an exemplary allocation of computing nodes to a job.

When a job 31 is submitted, the management node 100 allocates one or more of the computing nodes 1A to 9A, 1B to 9B, . . . , and 1F to 9F to the job 31. The number of computing nodes for the allocation and an adjacent relationship are specified by a user. In the case of a grid interconnected network, such as Mesh or Torus, the adjacent relationship is specified by a rectangular shape, that is, by the number of computing nodes arranged in each dimensional direction. In the case of a two-dimensional Mesh or Torus topology, (the number of computing nodes in X dimension)×(the number of computing nodes in Y dimension) are specified by the user.

The user may optimize the program of the job 31, assuming a group of computing nodes in a specific shape. Therefore, if a computing node group of different shape is allocated, a communication overhead may increase and thereby the execution efficiency of the job 31 may decrease. To deal with this, in primary, the management node 100 allocates a computing node group of shape specified by the user to the job 31. Referring to the example of FIG. 4, 3×3 computing nodes are specified for the allocation to the job 31. In response to this, the management node 100 allocates the computing nodes 1A to 3A, 1B to 3B, and 1C to 3C to the job 31.

The computing nodes 1A to 3A, 1B to 3B, and 1C to 3C allocated to the job 31 execute the program created by the user in parallel to thereby perform the process of the job 31. For example, when the scheduled start time of the job 31 comes, the management node 100 sends a command indicating where the program is stored and arguments to the computing nodes 1A to 3A, 1B to 3B, and 1C to 3C. The computing nodes 1A to 3A, 1B to 3B, and 1C to 3C read the program according to the command and run the program. Thereby, the computing nodes 1A to 3A, 1B to 3B, and 1C to 3C start the process of the job 31.

It is preferable that the job 31 continuously occupy the initially allocated computing nodes 1A to 3A, 1B to 3B, and 1C to 3C from its start to end. However, as will be described later, the management node 100 may interrupt the job 31 due to a schedule. The management node 100 may or may not change the allocation of the computing nodes to the job 31 before and after the interruption of the job 31. Referring to the example of FIG. 4, the computing nodes allocated to the job 31 are changed to the computing nodes 7D to 9D, 7E to 9E, and 7F to 9F. That is, the job 31 is moved (migrated) from the computing nodes 1A to 3A, 1B to 3B, and 1C to 3C to the computing nodes 7D to 9D, 7E to 9E, and 7F to 9F.

When the allocation of computing nodes to the job 31 is changed, data on the job 31 is transferred from the original computing nodes to the newly allocated computing nodes. Referring to the example of FIG. 4, data stored in the computing node 1A is transferred to the computing node 7D via the computing nodes 2A to 7A, 7B, and 7C. Thereby, the computing node 7D takes over the process of the job 31 from the computing node 1A. Similarly, data stored in the computing node 2A is transferred to the computing node 8D, and data stored in the computing node 3A is transferred to the computing node 9D. Data stored in the computing node 1B is transferred to the computing node 7E, data stored in the computing node 2B is transferred to the computing node 8E, and data stored in the computing node 3B is transferred to the computing node 9E. Data stored in the computing node 1C is transferred to the computing node 7F, data stored in the computing node 2C is transferred to the computing node 8F, and data stored in the computing node 3C is transferred to the computing node 9F.

The above nine data transfers may be performed in parallel. For example, the data transfer from the computing node 1A to the computing node 7D and the data transfer from the computing node 1B to the computing node 7E may be performed in parallel. However, it is probable that some of the computing nodes 4A to 9A, 4B to 9B, and 4C to 9C that relay the data transfers execute other jobs. Therefore, the transfer periods taken for the above data transfers may be affected by the execution states of other jobs and the use states of links used by the other jobs. In addition, even with respect to the job 31, one data transfer and another data transfer, which are performed in parallel, may pass through the same computing node or the same link, and the transfer periods taken for these data transfers may be affected by collisions of data transferred for the job 31.

The following describes how to interrupt a job that has already started.

FIGS. 5A to 5D illustrate an example of job interruption methods.

To interrupt the job 31 due to a schedule, an interruption method is selected from "job swapping", "checkpoint restart", and "migration". The checkpoint restart has the following two options, "restart on the same nodes" and "restart on different nodes".

Figure 5A:
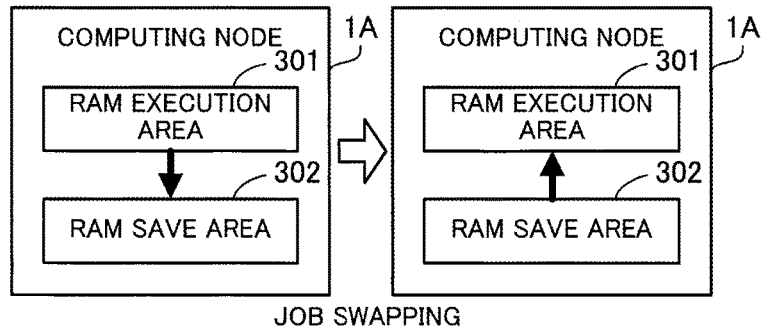
FIGS. 5A to 5D illustrate an example of job interruption methods.

The job swapping in FIG. 5A is an interruption method in which the data on a process that has been executed is saved to a main storage device (for example, a RAM) and then the data is restored after a certain time. The job swapping does not involve changing computing nodes used for the execution of the job 31 before and after the interruption.

For example, a RAM execution area 301 for storing data on running processes and a RAM save area 302 for saving data on interrupted processes are provided in a RAM of the computing node 1A. When the computing node 1A stops the job 31 with job swapping, the computing node 1A moves the data on the job 31 stored in the RAM execution area 301 to the RAM save area 302. This enables the RAM execution area 301 to store data on another job, and therefore it becomes possible to allocate the computing node 1A to another job. To restart the job 31, the computing node 1A moves the data on the job 31 from the RAM save area 302 to the RAM execution area 301.

Figure 5B:
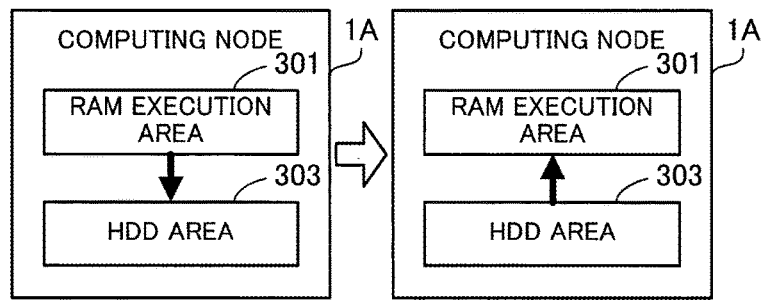

The checkpoint restart (restart on the same nodes) in FIG. 5B is an interruption method in which data on a process that has been executed is saved to an auxiliary storage device (for example, HDD) and then the data is restored after a certain time. Similarly to the job swapping, the checkpoint restart (restart on the same nodes) does not change computing nodes used for the execution of the job 31 before and after the interruption.

For example, an HDD area 303 for saving data on interrupted processes is provided in an HDD of the computing node 1A. When the computing node 1A stops the job 31 with the checkpoint restart (restart on the same nodes), the computing node 1A moves the data on the job 31 stored in the RAM execution area 301 to the HDD area 303. When restarting the job 31, the computing node 1A moves the data on the job 31 from the HDD area 303 to the RAM execution area 301.

Figure 5C:
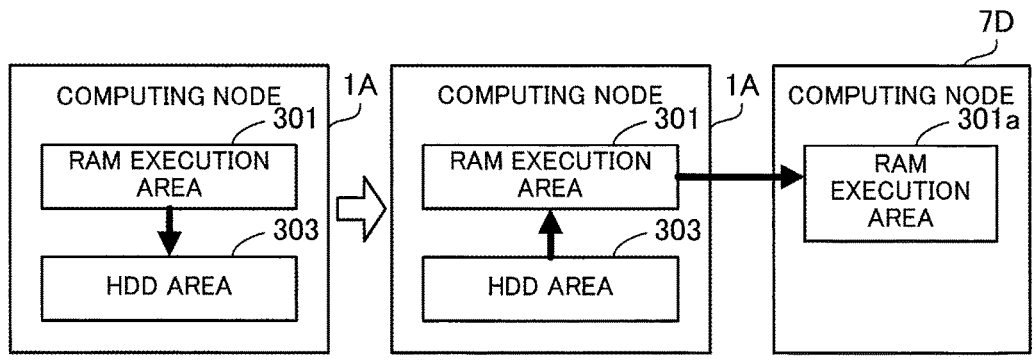

The checkpoint restart (restart on different nodes) in FIG. 5C is an interruption method in which data on a process that has been executed is saved to an auxiliary storage device and then the data is restored after a certain time, as in the case of the checkpoint restart (restart on the same nodes). What is different is that the checkpoint restart (restart on different nodes) uses a different computing node for the execution of the job 31 before and after the interruption.

For example, a RAM execution area 301a for storing data on running processes is provided in a RAM of the computing node 7D. The job 31 is stopped in the same way as the checkpoint restart (restart on the same nodes). When restarting the job 31, the computing node 1A moves the data on the job 31 stored in the HDD area 303 to the RAM execution area 301 or another area in the RAM of the computing node 1A. Then, the computing node 1A sends the data now stored in the RAM to the computing node 7D. The computing node 7D stores the data received from the computing node 1A in the RAM execution area 301a. Then, the computing node 7D executes the process of the job 31, which was executed on the computing node 1A before the interruption.

Figure 5D:
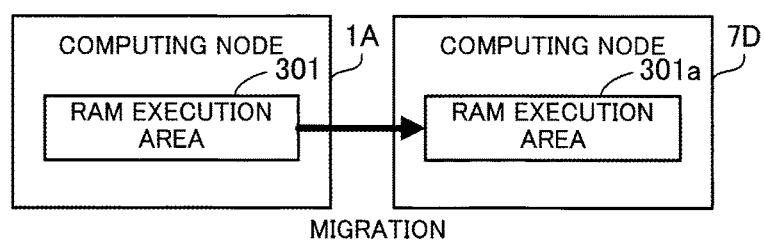

The migration in FIG. 5D is an interruption method in which data on a process that has been executed is transferred to another computing node immediately. Similarly to the checkpoint restart (restart on different nodes), the migration changes computing nodes used for the execution of the job 31 before and after the interruption. When interrupting the job 31 with the migration, the computing node 1A sends the data on the job 31 stored in the RAM execution area 301 to the computing node 7D. The computing node 7D stores the data received from the computing node 1A, in the RAM execution area 301a.

The management node 100 performs job scheduling by selecting an appropriate one of the above interruption methods. In this connection, there are some conditions for selecting each of the interruption methods. The job swapping is selected when the computing node 1A has sufficient free capacity in its main storage device because data on a plurality of jobs is stored in the main storage device. The checkpoint restart is selected when the computing node 1A has sufficient free capacity in its auxiliary storage device. The migration is selected when it is possible to allocate the computing node 7D to the job 31 at the time when the computing node 1A stops the process of the job 31.

Figure 6:
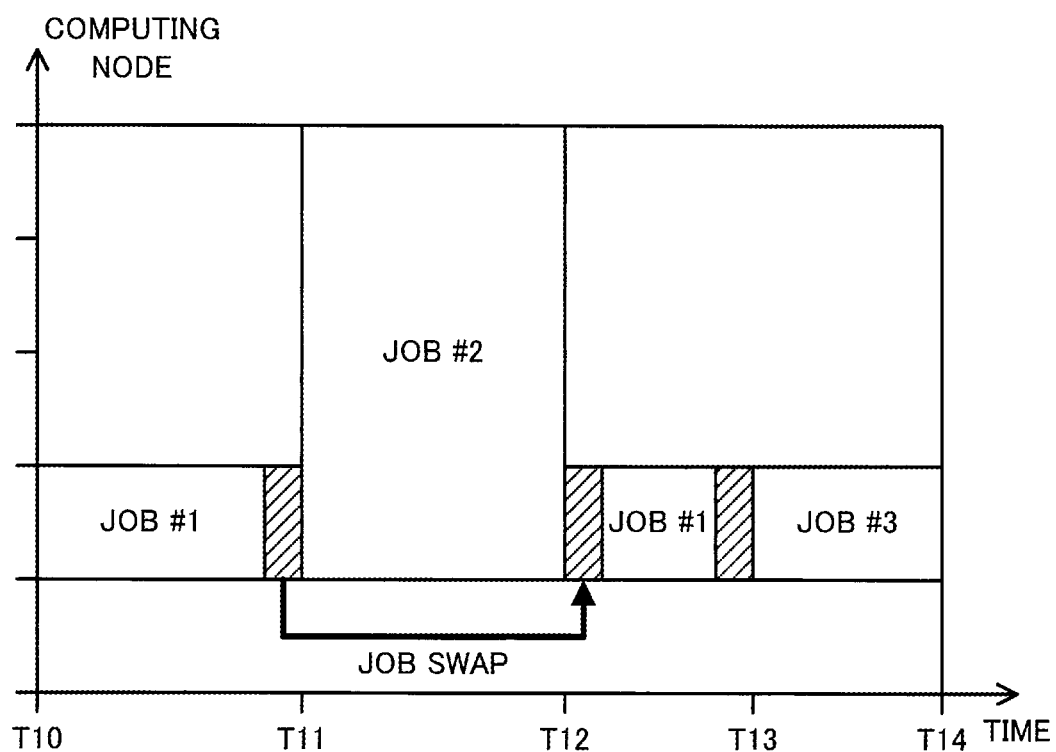
FIG. 6 illustrates an example of scheduling for job swapping.

FIG. 6 illustrates an example of scheduling for job swapping.

Assume now that the current schedule indicates that a computing node group is allocated to a job #2 from time T11 to time T12, and the computing node group is allocated to a job #3 from T13 to time T14. The computing node group is idle from time T10 to time T11 and from time T12 to time T13. In addition, assume that a job #1 whose expected execution period is longer than each of the above idle periods is submitted. In this case, since the computing resources are scarce, the management node 100 allows allocation of segmented idle computing resources to the job #1. For example, the management node 100 causes the job #1 to be started at time T10 on the condition that the above computing node group is made idle by time T11.

In the case of selecting the job swapping as an interruption method, saving job data needs a saving period to write the job data to a RAM. Therefore, the job #1 needs to be stopped at the time that is the saving period before time T11. Therefore, the available execution period for the job #1 before the interruption is from time T10 to the time that is the saving period before time T11. In addition, restoring the job data needs a restoration period to read the job data from the RAM. Therefore, the job #1 is restarted at the time that is the restoration period after time T12. Therefore, the available execution period for the job #1 after the interruption is from the time that is the restoration period after time T12, to time T13. Note that, if the job #1 is not expected to be completed before time T13, the available execution period for the job #1 is from the time that is the restoration period after time T12 to the time that is the saving period before time T13.

The management node 100 determines whether it is appropriate to select the job swapping, on the basis of the expected execution period of the job #1, the idle periods (from time T10 to time T11 and from T12 to time T13), an estimated value of the saving period, an estimated value of the restoration period, and others. This is because it is likely that, if each continuous available execution period is short, the job #1 is interrupted frequently, and therefore the actual efficiency of the use of nodes may decrease due to the saving and restoration overheads.

Figure 7:
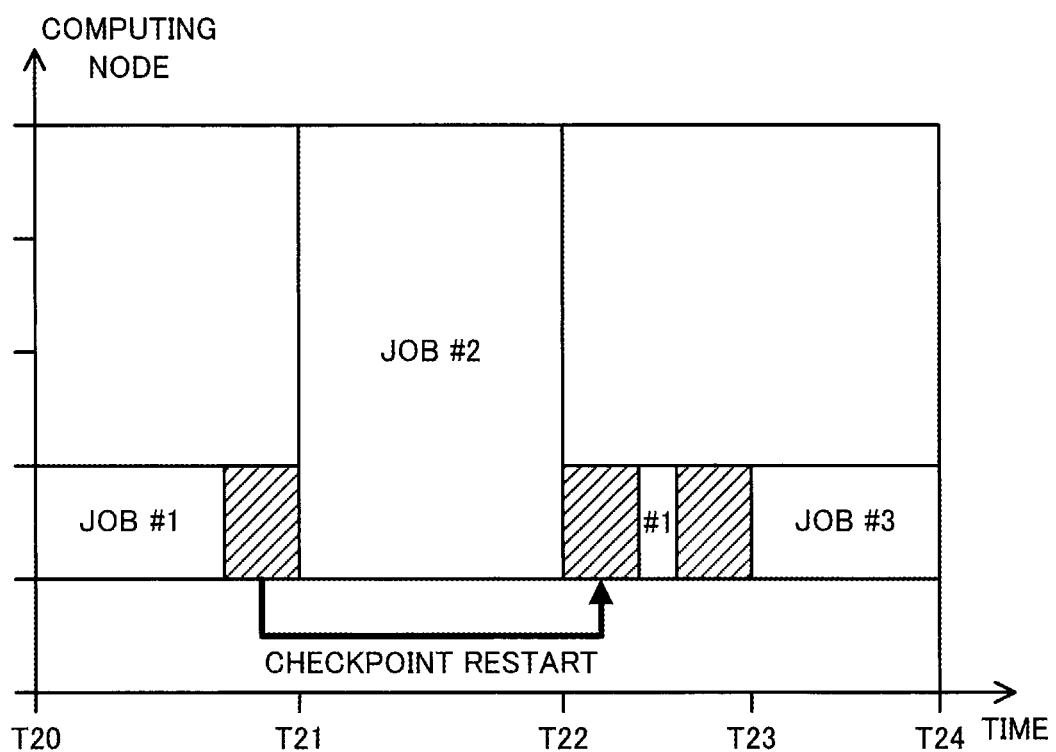
FIG. 7 illustrates a first example of scheduling for checkpoint restart.

FIG. 7 illustrates a first example of scheduling for checkpoint restart.

Assume now that the current schedule indicates that a computing node group is allocated to a job #2 from time T21 to time T22, and is allocated to a job #3 from time T23 to time T24. The computing node group is idle from time T20 to time T21 and from T22 to time T23. In addition, assume that a job #1 whose expected execution period is longer than each of the above idle periods is submitted. In this case, since the computing resources are scarce, the management node 100 allows allocation of segmented idle computing resources to the job #1. For example, the management node 100 causes the job #1 to be started at time T20.

In the case of selecting the checkpoint restart (restart on the same nodes) as an interruption method, saving job data needs a saving period to write the job data to an HDD. Therefore, the job #1 is stopped at the time that is the saving period before time T21. Therefore, the available execution period for the job #1 before the interruption is from time T20 to the time that is the saving period before time T21. In addition, restoring the job data needs a restoration period to read the job data from the HDD. Therefore, the job #1 is restarted at the time that is the saving period after time T22. Therefore, the available execution period for the job #1 after the interruption is from the time that is the restoration period after time T22 to time T23 (or to the time that is the saving period before time T23).

The management node 100 determines whether it is appropriate to select the checkpoint restart (restart on the same nodes), on the basis of the expected execution period of the job #1, the idle periods (from time T20 to time T21 and from time T22 to T23), an estimated value of the saving period, an estimated value of the restoration period, and others. In general, the saving period and restoration period in the checkpoint restart (restart on the same nodes) are longer than those in the job swapping.

Figure 8:
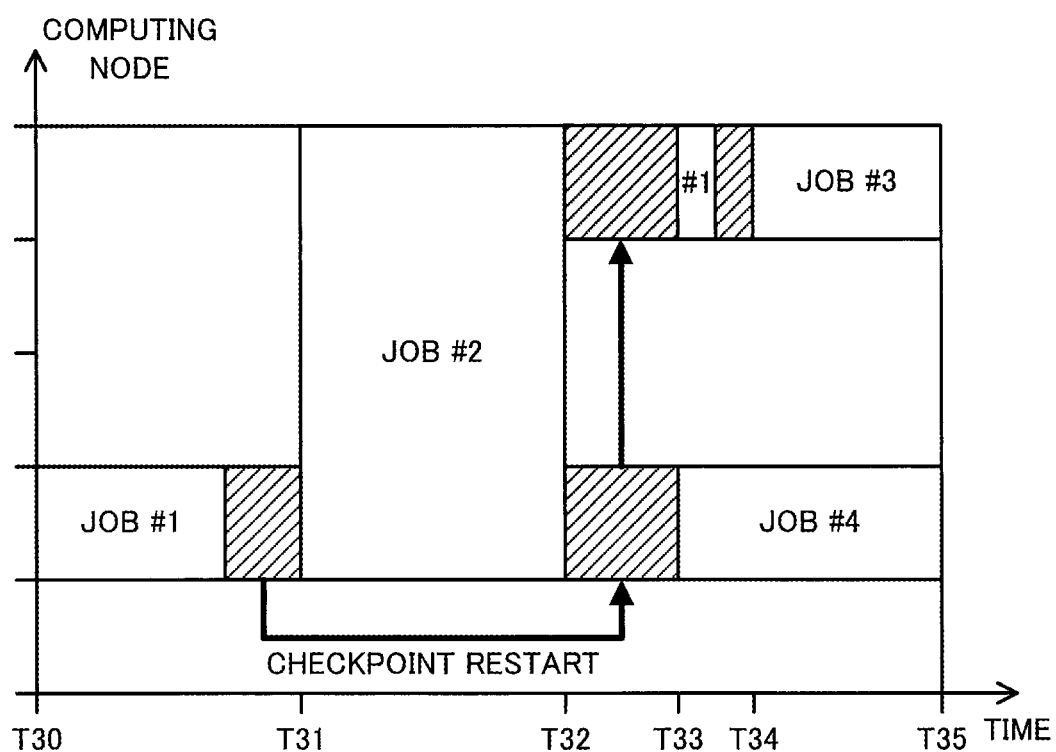
FIG. 8 illustrates a second example of scheduling for the checkpoint restart.

FIG. 8 illustrates a second example of scheduling for the checkpoint restart.

Assume now that the current schedule indicates that a computing node group is allocated to a job #2 from time T31 to time T32, and is allocated to a job #4 from T33 to time T35. The computing node group is idle from time T30 to time T31 and from time T32 to time T33. In addition, assume that another computing node group is allocated to the job #2 from time T31 to time T32 and is allocated to a job #3 from T34 to T35. The other computing node group is idle from time T32 to time T34. It is also assumed that a job #1 whose expected execution period is longer than each of the above idle periods is submitted. In this case, since the computing resources are scarce, the management node 100 allows allocation of segmented idle computing resources to the job #1. For example, the management node 100 causes the job #1 to be started at time T30.

In the case of selecting the checkpoint restart (restart on different nodes) as an interruption method, saving job data needs a saving period to write the job data to an HDD. Therefore, the job #1 is stopped at the time that is the saving period before time T31. Therefore, the available execution period for the job #1 before the interruption is from time T30 to the time that is the saving period before time T31. In addition, restoring the job data needs a restoration period to read the job data from the HDD, transfer the job data, and write the job data to a RAM. Therefore, the job #1 is restarted at the time that is the restoration period after time T32. Therefore, the available execution period for the job #1 after the interruption is from the time that is the restoration period after time T32 to time T34 (or to the time that is the saving period before time T34).

The management node 100 determines whether it is appropriate to select the checkpoint restart (restart on different nodes), on the basis of the expected execution period of the job #1, the idle periods (from time T30 to time T31 and from time T32 to time T34), an estimated value of the saving period, an estimated value of the restoration period including the transfer period, and others. In general, the restoration period in the checkpoint restart (restart on different nodes) is longer than that in the checkpoint restart (restart on the same nodes).

Figure 9:
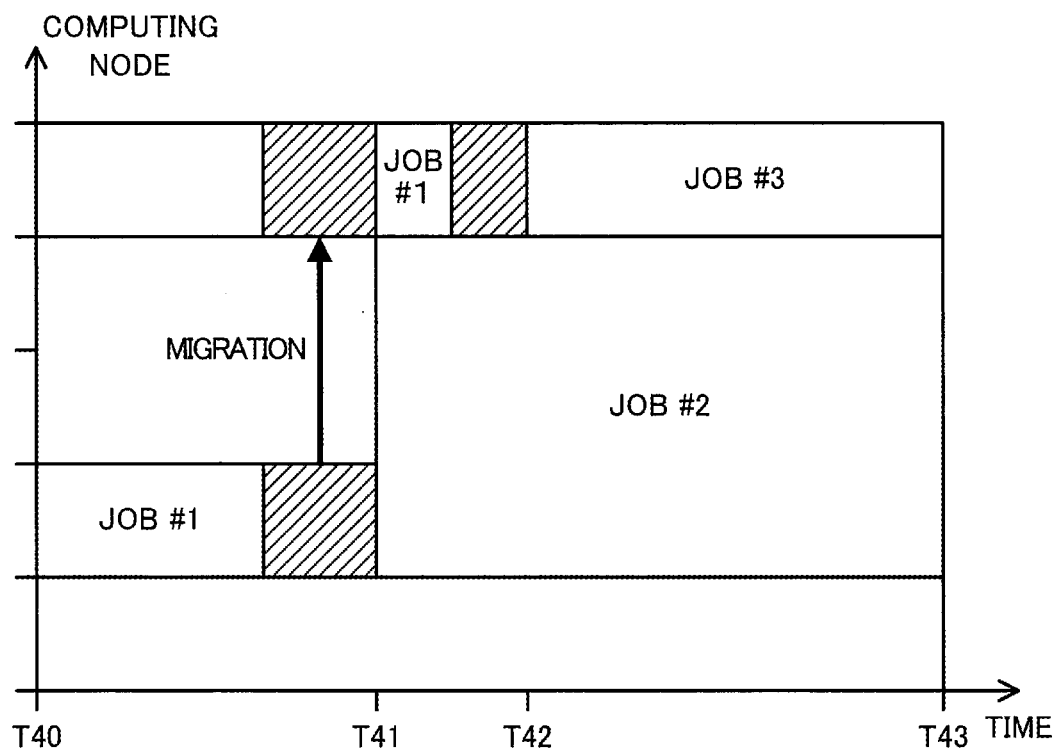
FIG. 9 illustrates an example of scheduling for migration.

FIG. 9 illustrates an example of scheduling for migration.

Assume now that the current schedule indicates that a computing node group is allocated to a job #2 from time T41 to time T43. The computing node group is idle from time T40 to time T41. In addition, assume that another computing node group is allocated to a job #3 from time T42 to time T43. The other computing node group is idle from time T40 to time T42. It is also assumed that a job #1 whose expected execution period is longer than each of the above idle periods is submitted. In this case, since the computing resources are scarce, the management node 100 allows allocation of segmented idle computing resources to the job #1. For example, the management node 100 causes the job #1 to be started at time T40.

In the case of selecting the migration as an interruption method, there needs a migration period to read data from a RAM, transfer the data, and write the data to a RAM. Therefore, the job #1 is stopped at the time that is the migration period before time T41. Therefore, the available execution period for the job #1 before the interruption is from time T40 to the time that is the migration period before time T41. In addition, the available execution period for the job #1 after the interruption is from time T41 to time T42 (or to the time that is the saving period before time T42).

The management node 100 determines whether it is appropriate to select the migration, on the basis of the expected execution period of the job #1, the idle periods (from time T40 to time T41 and from T41 to time T42), an estimated value of the migration period including the transfer period, and others.

As described above, when performing job scheduling, the management node 100 estimates the saving period and restoration period, or the migration period. The accuracy in the estimation of these saving period, restoration period, and migration period has an effect on the processing performance (throughput) of the parallel computing system. Therefore, the management node 100 dynamically calculates such estimated values considering a variety of factors, instead of static calculation based only on hardware performance. The following mainly describes how to estimate the saving period and restoration period, and the migration period.

Figure 10:
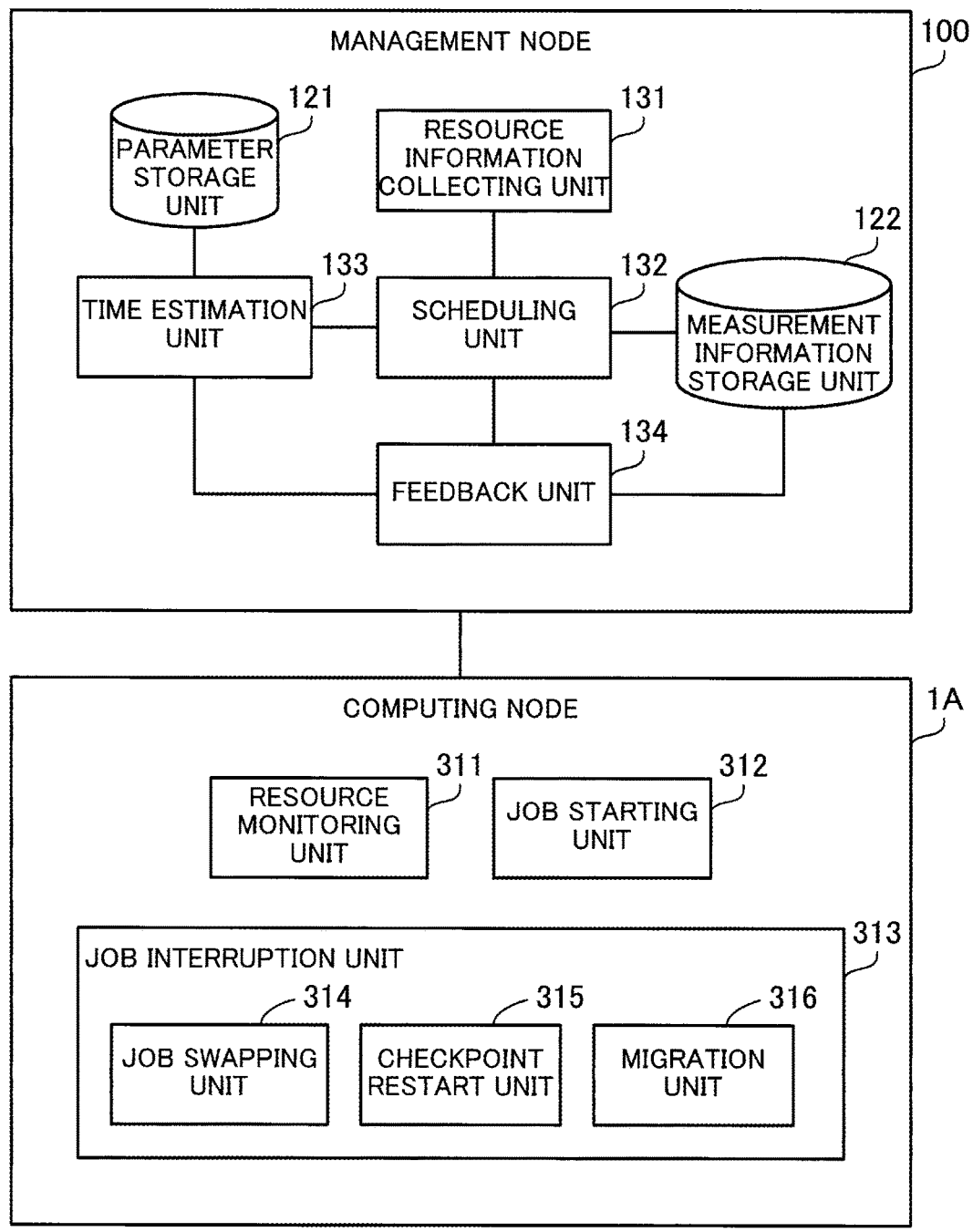
FIG. 10 is a block diagram illustrating an example of functions of a management node and a computing node.

FIG. 10 is a block diagram illustrating an example of functions of a management node and a computing node.

The management node 100 includes a parameter storage unit 121, a measurement information storage unit 122, a resource information collecting unit 131, a scheduling unit 132, a time estimation unit 133, and a feedback unit 134. The parameter storage unit 121 and measurement information storage unit 122 are implemented by using a storage area saved in the RAM 102 or HDD 103, for example. The resource information collecting unit 131, scheduling unit 132, time estimation unit 133, and feedback unit 134 are implemented as program modules that are executed by the CPU 101, for example.

The parameter storage unit 121 stores predetermined constant values that are parameter values to be used for estimating time periods related to a job interruption, including a saving period, a restoration period, and a migration period. The constant values are determined on the basis of the hardware performance of the computing nodes 1A to 9A, 1B to 9B, . . . , and 1F to 9F and links. In addition, the parameter storage unit 121 stores coefficients that are parameter values to be used for estimating time periods related to a job interruption and are updated by the feedback unit 134. The measurement information storage unit 122 stores variables that are index values used for estimating time periods related to a job interruption and vary depending on the execution state of a job. In addition, the measurement information storage unit 122 stores transfer periods each measured after the time periods related to a job interruption are estimated. The index values and transfer periods stored in the measurement information storage unit 122 are referenced when regression analysis is performed to calculate coefficients to be used for estimating time periods related to a job interruption.

The resource information collecting unit 131 periodically collects resource information indicating the use states of resources from the computing nodes 1A to 9A, 1B to 9B, . . . , and 1F to 9F. The resource information indicates the memory usage of a process running on an individual computing node. The resource information also indicates the link usage (data communication amount) of an individual computing node per link and unit time. In response to a request from the scheduling unit 132, the resource information collecting unit 131 provides the scheduling unit 132 with at least part of the latest resource information.

The scheduling unit 132 determines a schedule for jobs, that is, which computing nodes and what time to execute each submitted job. The scheduling unit 132 holds topology information indicating the topology of the interconnected network 30 and the coordinates of the computing nodes 1A to 9A, 1B to 9B, . . . , and 1F to 9F. The scheduling unit 132 also holds schedule information indicating a job schedule determined by the current time. The topology information and schedule information may be stored in the RAM 102 or HDD 103.

For each job, computing node conditions (for example, 3×3 computing nodes or the like) indicating the number of computing nodes to be used for the job and an adjacent relationship are specified by a user. In addition, for each job, an expected execution period of the job is specified by the user. When a new job is submitted, the scheduling unit 132 refers to the latest schedule information to find computing resources that satisfy the computing node conditions and have a continuous idle period longer than the expected execution period. If there are no computing resources satisfying the conditions within a predetermined time period from the current time, the scheduling unit 132 considers using segmented computing resources.

In the case of using segmented computing resources, the scheduling unit 132 allocates, to a job, computing nodes that have a continuous idle period shorter than the expected execution period of the job in order to start the job early. If the allocated time period approaches its end, the scheduling unit 132 refers to the latest schedule information to determine an interruption method and computing nodes (restart nodes) to be used for restarting the job. The interruption method and restart nodes are determined considering the estimated values of time periods (saving period and restoration period, or migration period) related to the job interruption.

In the case of considering the job swapping or checkpoint restart (restart on the same nodes) as the interruption method, the scheduling unit 132 calculates the memory usage of the computing nodes allocated to the job, on the basis of the resource information collected by the resource information collecting unit 131. Then, the scheduling unit 132 requests the time estimation unit 133 to estimate the saving period and restoration period by specifying the interruption method and the memory usage. The scheduling unit 132 determines on the basis of the estimated saving period and restoration period whether to employ the selected interruption method and the selected candidates of the restart nodes, in view of the efficiency of the use of nodes.

In the case of considering the checkpoint restart (restart on different nodes) or migration as the interruption method, the scheduling unit 132 calculates the memory usage of the computing nodes allocated to the job, on the basis of the resource information collected by the resource information collecting unit 131. In addition, the scheduling unit 132 determines relay nodes located between each data transfer source and its corresponding data transfer destination, and calculates a plurality of index values that have an effect on a transfer period, on the basis of the collected resource information. Then, the scheduling unit 132 requests the time estimation unit 133 to estimate the saving period and restoration period, or the migration period by specifying the interruption method, the memory usage, and the plurality of index values. The scheduling unit 132 determines on the basis of the estimated saving period and restoration period, or migration period whether to employ the selected interruption method and the selected candidates of the restart nodes, in view of the efficiency of the use of nodes.

In addition, the scheduling unit 132 instructs the computing nodes 1A to 9A, 1B to 9B, . . . , and 1F to 9F to start the process of a job in accordance with a determined schedule. In the case where a job interruption with the job swapping or checkpoint restart is determined, the scheduling unit 132 instructs the related computing nodes to save data at the saving start time and instructs the related computing nodes to restore the data at the restoration start time. In the case where an job interruption with the migration is determined, the scheduling unit 132 instructs the related computing nodes to perform migration at the migration start time.

Further, in the case of employing the checkpoint restart (restart on different nodes) or migration, the scheduling unit 132 stores the calculated memory usage and a plurality of calculated index values in the measurement information storage unit 122. When data is transferred, the scheduling unit 132 measures the actual transfer period, and records the measured transfer period in the measurement information storage unit 122. Then, the scheduling unit 132 requests update of coefficients.

The time estimation unit 133 estimates time periods (saving period and restoration period, or migration period) related to a job interruption, in response to a request from the scheduling unit 132. To estimate the time periods, the time estimation unit 133 uses an interruption method, a memory usage, and a plurality of index values specified by the scheduling unit 132, and the constant values and coefficients stored in the parameter storage unit 121.

In the case where the job swapping or checkpoint restart (restart on the same nodes) is specified as an interruption method, the time estimation unit 133 estimates the saving period and restoration period on the basis of the memory usage and constant values. In the case where the checkpoint restart (restart on different nodes) is specified as an interruption method, the time estimation unit 133 estimates the saving period on the basis of the memory usage and constant values. The time estimation unit 133 also estimates the transfer period on the basis of the memory usage, the plurality of index values, constant values, and coefficients, and then estimates the restoration period including the transfer period. In the case where the migration is specified, the time estimation unit 133 estimates the transfer period, as in the case of the checkpoint restart (restart on different nodes), and estimates the migration period including the transfer period. How to estimate these kinds of time periods will be described in detail later.

The feedback unit 134 updates coefficients to be used for estimating a transfer period, in response to a request from the scheduling unit 132. The feedback unit 134 may be said to feed a measured transfer period back to the coefficients. The feedback unit 134 performs regression analysis using a combination of a plurality of index values, memory usage, and measured transfer period, stored in the measurement information storage unit 122, to calculate the coefficients. The feedback unit 134 overwrites the coefficients stored in the parameter storage unit 121 with the calculated coefficients via the time estimation unit 133.

In this connection, a plurality of combinations of a plurality of index values, memory usage, and measured transfer period are accumulated in the measurement information storage unit 122. The feedback unit 134 performs regression analysis using the plurality of combinations. All combinations used for the regression analysis may remain as they are in the measurement information storage unit 122, without being deleted. However, combinations that are stored for a predetermined time or longer after being written in the measurement information storage unit 122 may be deleted from the measurement information storage unit 122.

The computing node 1A includes a resource monitoring unit 311, a job starting unit 312, and a job interruption unit 313. The resource monitoring unit 311, job starting unit 312, and job interruption unit 313 may be implemented as program modules that are executed by the CPU 101, for example. The other computing nodes may be implemented with the same configuration as the computing node 1A.

The resource monitoring unit 311 generates and sends resource information relating to the computing node 1A to the management node 100. The resource monitoring unit 311 may send the resource information to the management node 100, in response to a request therefrom or periodically without any request. The resource information indicates the size (memory usage) of the RAM area used for the process of a running job in the computing node 1A. The resource information also indicates an average amount (for example, an average value within the most recent time period) of data transmitted per unit time from the computing node 1A, for each link connected to the computing node 1A.

When receiving a job start command from the management node 100, the job starting unit 312 executes a program specified by the job start command, by applying arguments specified by the job start command. Thereby, the process of the job starts on the computing node 1A.

The job interruption unit 313 interrupts a job in response to an instruction from the management node 100. The job interruption unit 313 includes a job swapping unit 314, a checkpoint restart unit 315, and a migration unit 316.

When receiving a saving notification specifying the job swapping, the job swapping unit 314 stops a running process, and saves data on the process to another storage area of the RAM. When receiving a restoration notification thereafter, the job swapping unit 314 restores the saved data to the original place and then restarts the process.

When receiving a saving notification specifying the checkpoint restart (restart on the same nodes), the checkpoint restart unit 315 stops a running process, and saves data on the process to the HDD. When receiving a restoration notification thereafter, the checkpoint restart unit 315 restores the saved data to the RAM and then restarts the process.

When receiving a saving notification specifying the checkpoint restart (restart on different nodes), the checkpoint restart unit 315 stops a running process, and saves data on the process to the HDD. When receiving a restoration notification specifying a restart node thereafter, the checkpoint restart unit 315 writes the saved data to the RAM and then transfers the data to the specified restart node. In addition, when receiving data from another computing node, the checkpoint restart unit 135 stores the received data in the RAM and then restarts a process. When the data transfer is completed, the checkpoint restart unit 315 sends a completion notification to the management node 100. In this connection, the management node 100 may send the restoration notification to the restart node, as well as to the transfer source computing node.

When receiving a migration notification specifying a restart node, the migration unit 316 stops a running process, and transfers data on the process to the specified restart node. In addition, when receiving data from another computing node, the migration unit 316 stores the received data in the RAM and then restarts the process. When the data transfer is completed, the migration unit 316 sends a completion notification to the management node 100. In this connection, the management node 100 may send the migration notification to the migration destination node, as well as to the migration source computing node.

FIG. 11 illustrates an example of a constant value table.

A constant value table 123 is stored in the parameter storage unit 121. The constant value table 123 contains combinations of constant value name and set value. The constant value names include RAM read speed, RAM write speed, HDD read speed, HDD write speed, and ideal bandwidth.

The RAM read speed refers to how much data is readable from a RAM per unit time. The RAM write speed refers to how much data is writable to a RAM per unit time. The RAM read speed and RAM write speed may have the same value. The HDD read speed refers to how much data is readable from an HDD per unit time. The HDD write speed refers to how much data is writable to an HDD per unit time. The ideal bandwidth refers to a theoretical transfer speed for transferring data between two computing nodes.

FIG. 12 illustrates an example of a regression analysis table.

A regression analysis table 124 is stored in the measurement information storage unit 122. The regression analysis table 124 includes fields for node utilization, average link usage, link usage variance, hop count, job size, memory usage, and transfer period. The node utilization, average link usage, link usage variance, hop count, and job size are index values that have an effect on a transfer period.

The node utilization refers to a ratio of relay nodes executing other jobs to relay nodes that relay data on a job. Relay nodes are computing nodes that are located between a transfer source node group and a transfer destination node group and transfer data on at least one process belonging to a job. Which computing nodes serve as relay nodes depends on a routing algorithm. In the example of FIG. 4, computing nodes 4A to 9A, 4B to 9B, and 4C to 9C serve as relay nodes.

The average link usage refers to an average amount of data transmitted per link and unit time over all links connected to relay nodes. The link usage variance refers to a variance in the amount of data transmitted per link and unit time over all links connected to relay nodes. The hop count refers to an average number of relay links among all combinations of transfer source node and transfer destination node. Referring to the example of FIG. 4, nine links exist between the transfer source node and the transfer destination node of each combination, and therefore the hop count is nine. The job size refers to the number of computing nodes allocated to a job to be transferred.

The memory usage refers to an average memory usage per computing node among all computing nodes allocated to a job to be transferred. In this connection, the total memory usage of all computing nodes allocated to the job (the total memory usage of the job) may be used as an index value. Alternatively, the maximum memory usage among the computing nodes allocated to the job may be used as an index value. The transfer period refers to a measured value of the time period taken to transfer data. In the second embodiment, a time period from when the management node 100 sends a restoration notification or migration notification to the first computing node to when the management node 100 receives a completion notification from the last computing node is measured as the transfer period.

FIG. 13 illustrates an example of a coefficient table.

An estimation equation for estimating a transfer period includes five coefficients to give weights to the above-described five index values (node utilization, average link usage, link usage variance, hop count, and job size). These five coefficients are calculated through regression analysis by the feedback unit 134.

The coefficient table 125 is stored in the parameter storage unit 121. The coefficient table 125 contains combinations of coefficient name and calculated value. Coefficient names include a coefficient A corresponding to the node utilization, a coefficient B corresponding to the average link usage, a coefficient C corresponding to the link usage variance, a coefficient D corresponding to the hop count, and a coefficient E corresponding to the job size. The calculated values of these five coefficients are represented as real numbers. In this connection, before the regression analysis, the calculated values for the coefficients A, B, C, D, and E are set to zero or other predetermined values.

The following describes how to estimate time periods related to a job interruption.

A saving period for the job swapping of FIG. 5A is calculated by (memory usage)/(RAM write speed). The memory usage is a variable and is calculated from collected resource information. The RAM write speed is a constant value and is registered in the constant value table 123. A restoration period for the job swapping is calculated by (memory usage)/(RAM read speed). The RAM read speed is a constant value and is registered in the constant value table 123.

A saving period for the checkpoint restart (restart on the same nodes) of FIG. 5B is calculated by (memory usage)/(HDD write speed). The HDD write speed is a constant value and is registered in the constant value table 123. A restoration period for the checkpoint restart (restart on the same nodes) is calculated by (memory usage)/(HDD read speed). The HDD read speed is a constant value and is registered in the constant value table 123.

A saving period for the checkpoint restart (restart on different nodes) of FIG. 5C is calculated by (memory usage)/(HDD write speed). A restoration period for the checkpoint restart (restart on different nodes) is calculated by (memory usage)/(HDD read speed)+(transfer period)+(memory usage)/(RAM write speed).

A migration period for the migration of FIG. 5D is calculated by (memory usage)/(RAM read speed)+(transfer period)+(memory usage)/(RAM write speed).

The above-described transfer period is calculated by (memory usage)/(average bandwidth). The average bandwidth refers to a realistic transfer speed for the case of transferring data between two computing nodes. The average bandwidth is calculated by (ideal bandwidth)+$Ax_0$+$Bx_1$+$Cx_2$+$Dx_3$+$Ex_4$.

The ideal bandwidth is a constant value and is registered in the constant value table 123. The term $x_0$ is a variable indicating node utilization and is calculated from schedule information. The term $x_1$ is a variable indicating an average link usage and is calculated from collected resource information. The term $x_2$ is a variable indicating a link usage variance and is calculated from collected resource information. The term $x_3$ is a variable indicating a hop count and is calculated from topology information. The term $x_4$ is a variable indicating a job size and is calculated from schedule information. The coefficients A, B, C, D, and E indicate the weights of effects that the variables $x_0$, $x_1$, $x_2$, $x_3$, and $x_4$ have on an average bandwidth, and are registered in the coefficient table 125. It is possible to improve the accuracy in the estimation of transfer period by feeding an actual transfer period back to the coefficients A, B, C, D, and E.

The following describes processes that are performed by the management node 100.

Figure 14:
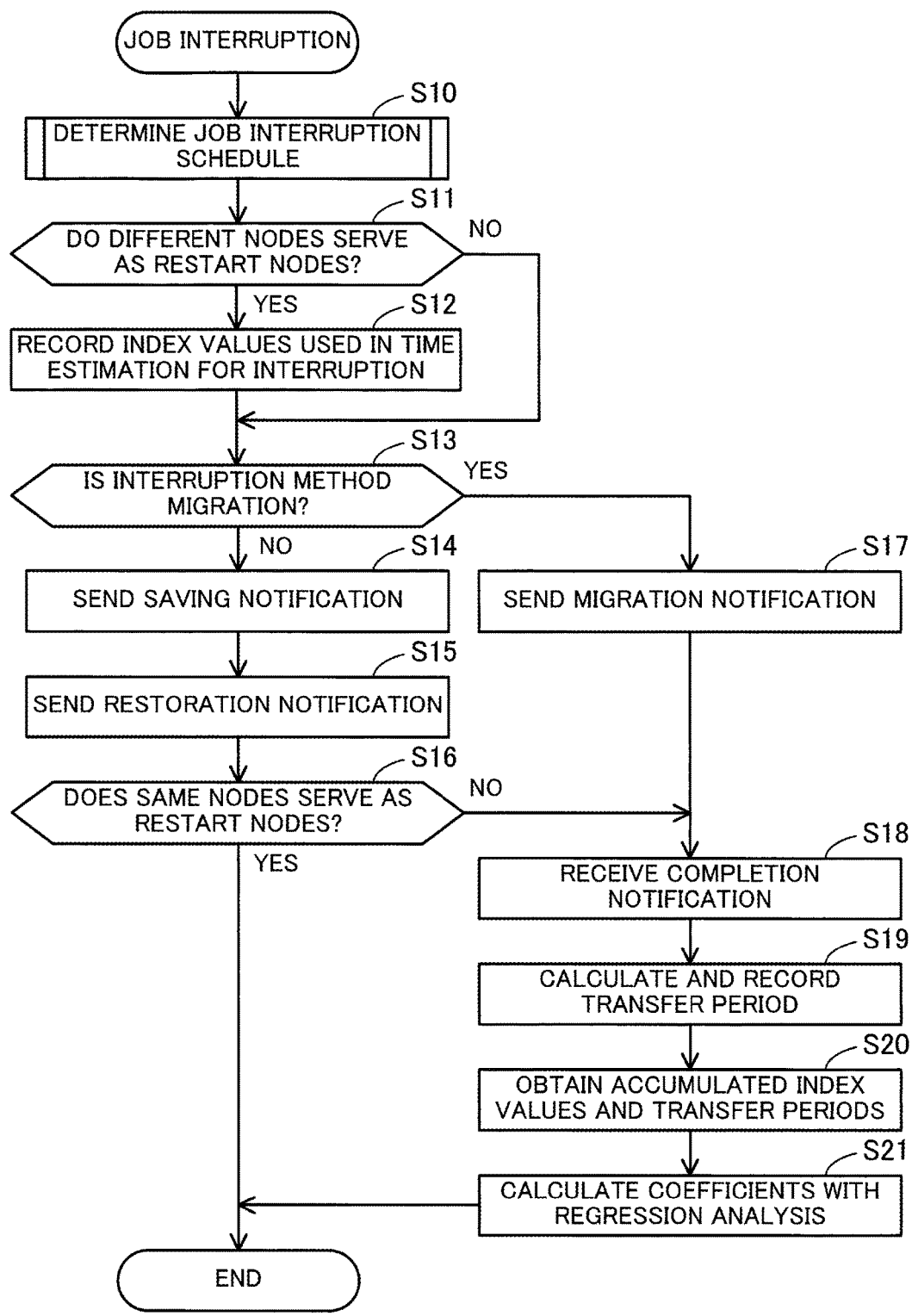
FIG. 14 is a flowchart illustrating an exemplary procedure for job interruption.

FIG. 14 is a flowchart illustrating an exemplary procedure for job interruption.

A job interruption process is executed when computing resources whose idle periods are shorter than the expected execution period of a job are allocated to the job and the allocated time period of the computing resources for the job approaches its end (for example, the scheduled start time of the next job becomes less than a predetermined time period away).

(S10) The scheduling unit 132 determines a job interruption schedule. The job interruption schedule indicates an interruption method, restart nodes, a saving period (estimated), a saving start time, a saving completion time, a restoration period (estimated), a restoration start time, a restoration completion time, a migration period (estimated), a migration start time, a migration completion time, and others. How to determine the job interruption schedule will be described in detail later.

(S11) The scheduling unit 132 determines whether the determined restart nodes are different from the computing nodes currently executing the target job. If they are different, the process proceeds to step S12. If they are the same, the process proceeds to step S13.

(S12) The scheduling unit 132 records the index values and memory usage used for estimating time periods related to the job interruption, including the saving period, restoration period, and migration period in the regression analysis table 124 stored in the measurement information storage unit 122. The index values include node utilization, an average link usage, a link usage variance, a hop count, and a job size.

(S13) The scheduling unit 132 determines whether the interruption method is the migration. If the interruption method is the migration, the process proceeds to step S17. If the interruption method is the job swapping or checkpoint restart, the process proceeds to step S14.

(S14) The scheduling unit 132 sends a saving notification to each computing node currently executing the target job when the determined saving start time comes.

(S15) The scheduling unit 132 sends a restoration notification to each computing node that executed the target job when the determined restoration start time comes. At this time, the scheduling unit 132 records the time when the first restoration notification was sent. In this connection, if the restart nodes are different from the computing nodes that executed the target node, the scheduling node 132 may further send the restoration notification to each data transfer destination computing nodes.

(S16) The scheduling unit 132 determines whether the restart nodes are the same as the computing nodes that executed the target job. If they are the same, the job interruption process is completed. If they are different, the process proceeds to step S18.

(S17) The scheduling unit 132 sends a migration notification to each computing node currently executing the target job when the determined migration start time comes. At this time, the scheduling unit 132 records the time when the first migration notification was sent. In this connection, the scheduling unit 132 may further send the migration notification to each migration destination computing node.

(S18) The scheduling unit 132 receives completion notifications indicating the completion of a data transfer in response to the restoration notification of step S15 or the migration notification of step S17. For example, the completion notifications are sent from the transfer destination or migration destination computing nodes.

(S19) The scheduling unit 132 measures, as the transfer period, a time period from when the first restoration notification or migration notification was sent (the time recorded at step S15 or S17) to when the final completion notification was received. Then, the scheduling unit 132 records the measured transfer period in association with the index values and memory usage recorded at step S12 in the regression analysis table 124.

(S20) The scheduling unit 132 requests the feedback unit 134 to update the coefficients. The feedback unit 134 obtains a plurality of accumulated combinations of index values, memory usage, and transfer period from the regression analysis table 124.

(S21) The feedback unit 134 performs regression analysis using the combinations of the index values, memory usage, and transfer period obtained at step S20 to calculate the coefficients A, B, C, D, and E that are used in the estimation of transfer period. For example, the feedback unit 134 performs the regression analysis using (average bandwidth) =(memory usage)/(transfer period) as an objective variable (dependent variable), and also using node utilization, an average link usage, a link usage variance, a hop count, and a job size as explanatory variables (independent variables).

The feedback unit 134 notifies the time estimation unit 133 of the calculated coefficients A, B, C, D, and E. The time estimation unit 133 overwrites the coefficients A, B, C, D, and E in the coefficient table 125 stored in the parameter storage unit 121 with the received coefficients A, B, C, D, and E, to thereby update the coefficient table 125.

Figure 15:
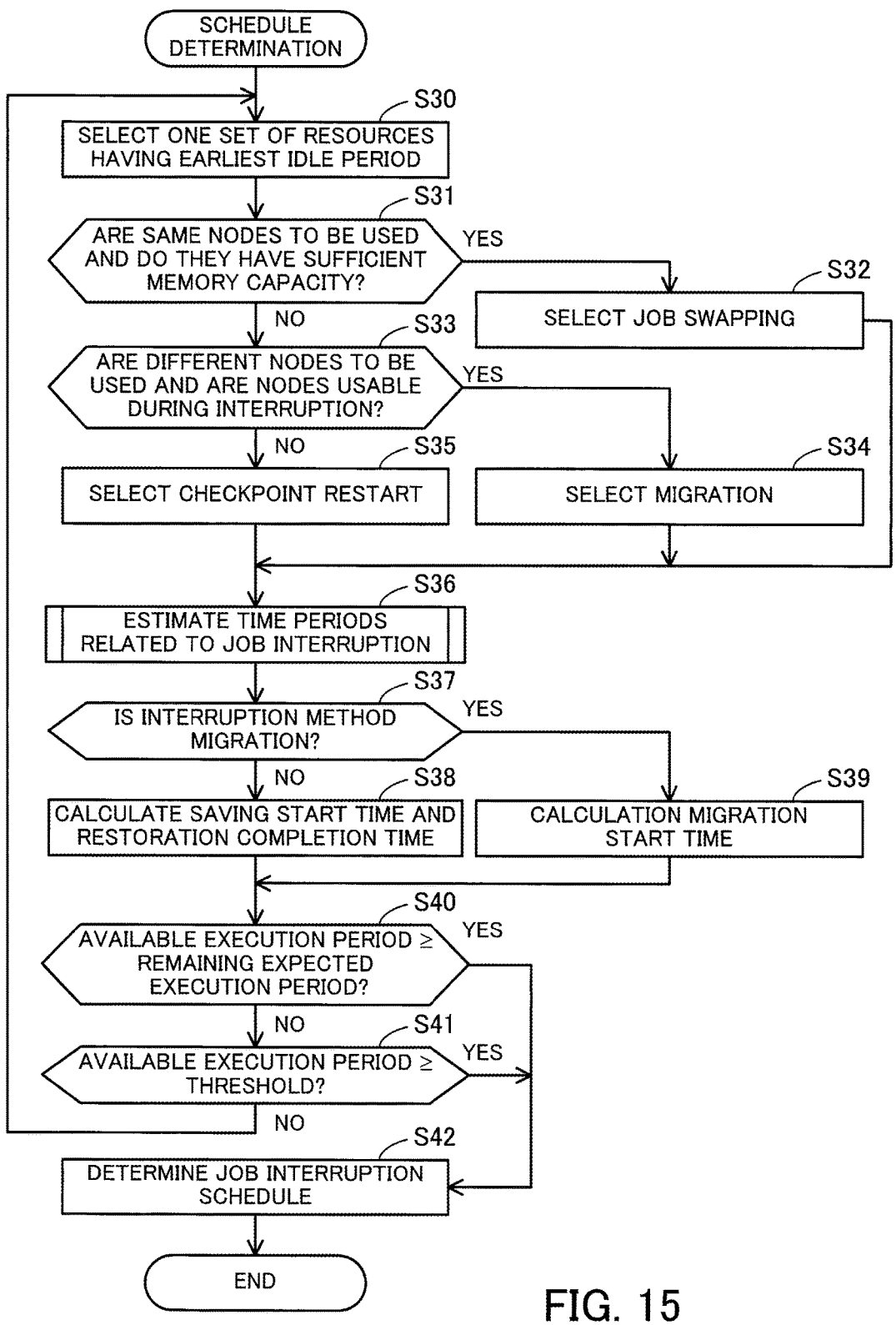
FIG. 15 is a flowchart illustrating an exemplary procedure for schedule determination.

FIG. 15 is a flowchart illustrating an exemplary procedure for schedule determination.

A schedule determination process is performed at step S10.

(S30) The scheduling unit 132 detects sets of idle computing resources (each set corresponding to a group of adjacent computing nodes and having a continuous idle period) that are idle after the current time, on the basis of the latest schedule information, and sorts the detected sets of idle computing resources according to ascending order of idle period. The sets of idle computing resources to be detected are limited to those which satisfy the computing node conditions (the number of computing nodes to be used and an adjacent relationship) of the target job. The scheduling unit 132 selects one set of idle computing resources having the earliest idle period.

(S31) The scheduling unit 132 determines whether the computing nodes having the idle computing resources selected at step S30 are the same as the computing nodes currently executing the target job. The scheduling unit 132 also determines whether all computing nodes currently executing the target job have sufficient memory capacity remaining for additionally storing data on other jobs (for example, whether the remaining memory capacity is greater than or equal to a threshold). The latter condition is judged based on the memory usage of each computing node indicated by collected resource information. If the above two conditions are satisfied, the process proceeds to step S32. If at least one of the conditions is not satisfied, the process proceeds to step S33.

(S32) The scheduling unit 132 selects the job swapping.

(S33) The scheduling unit 132 determines whether the computing nodes having the selected idle computing resources are different from the computing nodes currently executing the target job. The scheduling unit 132 also determines whether the currently used computing resources and the selected idle computing resources are usable at the same time during the interruption (for example, whether the currently used computing resources and the selected idle computing resources overlap for a predetermined time period or longer in the time domain). If the above two conditions are satisfied, the process proceeds to step S34. If at least one of the conditions is not satisfied, the process proceeds to step S35.

(S34) The scheduling unit 132 selects the migration.

(S35) The scheduling unit 132 selects the checkpoint restart.

(S36) The scheduling unit 132 causes the time estimation unit 133 to estimate time periods related to the job interruption. In the case where the job swapping or checkpoint restart is selected, a saving period and a restoration period are estimated. In the case where the migration is selected, a migration period is estimated. The time estimation will be described later.

(S37) The scheduling unit 132 determines whether the interruption method is the migration. If the interruption method is the migration, the process proceeds to step S39. If the interruption method is the job swapping or checkpoint restart, the process proceeds to step S38.

(S38) The scheduling unit 132 calculates, as the saving start time, a time point that is the saving period before the end of the idle period of the currently used computing resources (i.e., before the scheduled start time of the next job). The scheduling unit 132 also takes the end of the idle period of the currently used computing resources as the saving completion time, and the scheduled completion time of the next job as the restoration start time. In addition, the scheduling unit 132 calculates, as the restoration completion time, a time point that is the restoration period after the restoration start time. The scheduling unit 132 calculates, as the available execution period, a time period from the restoration completion time to the end of the idle period of the selected idle computing resources. Note that the scheduling unit 132 may subtract the saving period needed for performing the next job interruption from the available execution period.

(S39) The scheduling unit 132 calculates, as the migration start time, a time point that is the migration period before the end of the idle period of the currently used computing resources (i.e., before the scheduled start time of the next job). The scheduling unit 132 also takes the end of the idle period of the currently used computing resources as the migration completion time. The scheduling unit 132 calculates, as the available execution period, a time period from the migration completion time to the end of the idle period of the selected idle computing resources. Note that the scheduling unit 132 may subtract the saving period needed for performing the next job interruption from the available execution period.

(S40) The scheduling unit 132 calculates the remaining expected execution period of the target job, which remains after the target job ends the use of the currently used computing resources. The remaining expected execution period may be calculated based on the expected execution period initially specified for the target job and the schedule information. The scheduling unit 132 determines whether the available execution period calculated at step S38 or S39 is greater than or equal to the remaining expected execution period. If the available execution period is greater than or equal to the remaining expected execution period, the process proceeds to step S42; otherwise, the process proceeds to step S41.

(S41) The scheduling unit 132 determines whether the available execution period calculated at step S38 or S39 is greater than or equal to a predetermined threshold. If the available execution period is greater than or equal to the predetermined threshold, the process proceeds to step S42; otherwise, the process proceeds to step S30 to select a set of idle computing resources having the next earliest idle period as a candidate for the allocation.

(S42) The scheduling unit 132 determines a job interruption schedule using the finally selected set of idle computing resources. The job interruption schedule indicates the interruption method, restart nodes, saving period, saving start time, saving completion time, restoration period, restoration start time, restoration completion time, migration period, migration start time, migration completion time, and others.

Figure 16:
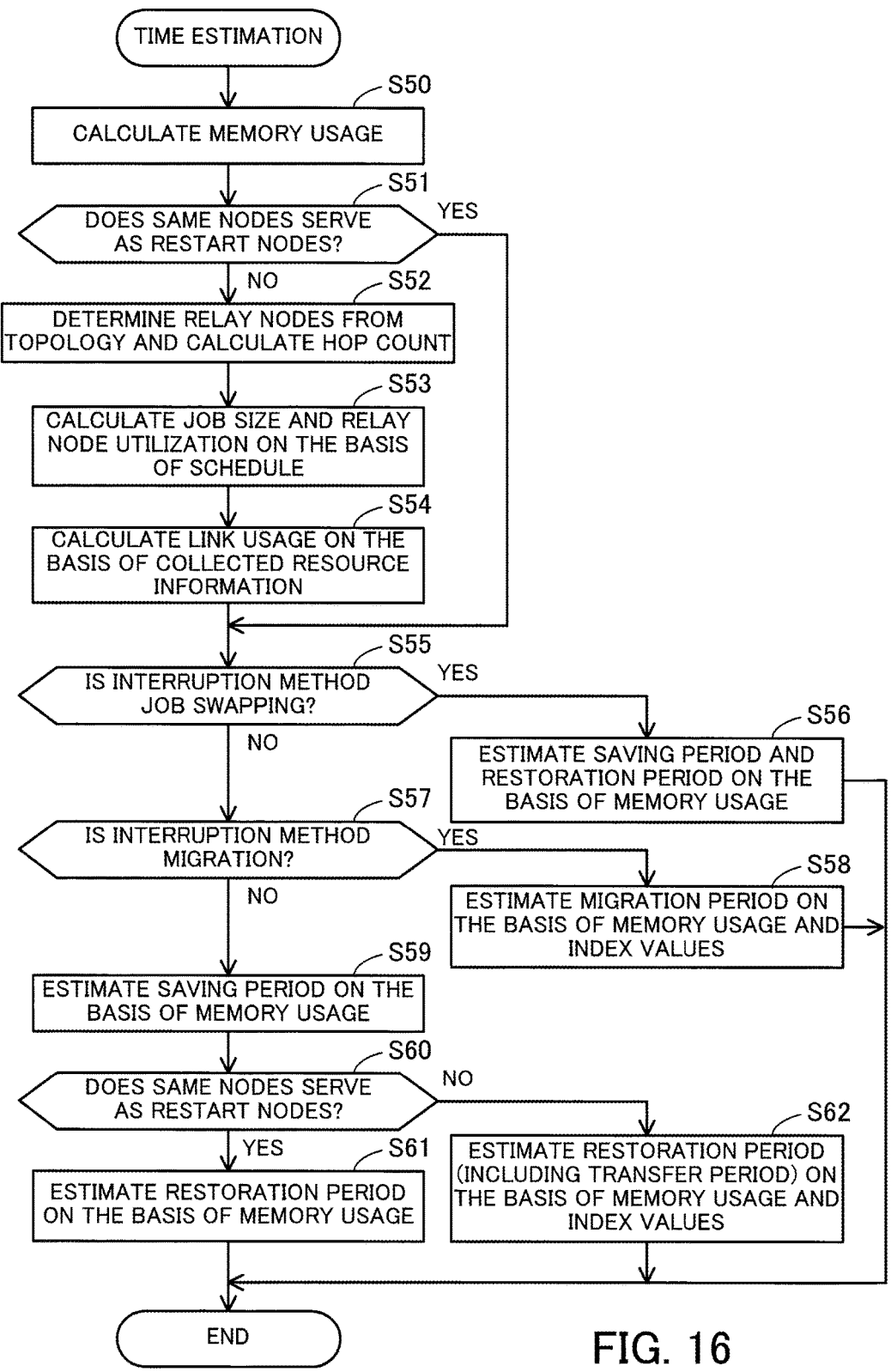
FIG. 16 is a flowchart illustrating an exemplary procedure for time estimation.

FIG. 16 is a flowchart illustrating an exemplary procedure for time estimation.

A time estimation process is performed at step S36.

(S50) The scheduling unit 132 calculates a memory usage. For example, the scheduling unit 132 obtains the memory usage of each computing node currently executing the target job, from the collected resource information, and then calculates the average memory usage or the maximum memory usage.

(S51) The scheduling unit 132 determines whether the restart nodes are the same as the computing nodes currently executing the target job. If they are the same, the process proceeds to step S55. If they are different, the process proceeds to step S52.

(S52) The scheduling unit 132 determines relay nodes that relay data on the target job, on the basis of the topology information, the coordinates of the computing nodes currently executing the target job, the coordinates of the restart nodes, and the routing algorithm previously set in each computing node. The scheduling unit 132 also calculates the hop count for each combination of transfer source computing node and transfer destination computing node, and calculates the average hop count.

(S53) The scheduling unit 132 calculates the number of nodes (job size) allocated to the target job, on the basis of the schedule information. The schedule unit 132 also counts relay nodes allocated to other jobs, among the relay nodes determined at step S52, on the basis of the schedule information, and calculates (the counted number of relay nodes)/(the total number of determined relay nodes), as the node utilization.

(S54) The scheduling unit 132 obtains the link usage of each relay node determined at step S52, from the collected resource information, and calculates the average link usage of the relay nodes per link and a link usage variance.

(S55) The scheduling unit 132 requests the time estimation unit 133 to estimate time periods related to the job interruption by specifying the interruption method and the memory usage calculated at step S50. In the case where the restart nodes are different from the currently used computing nodes, the scheduling unit 132 further specifies the hop count calculated at step S52, the job size and node utilization calculated at step S53, and the average link usage and link usage variance calculated at step S54. The time estimation unit 133 determines whether the interruption method is the job swapping. If the interruption method is the job swapping, the process proceeds to step S56; otherwise, the process proceeds to step S57.

(S56) The time estimation unit 133 estimates the saving period on the basis of the specified memory usage and the RAM write speed registered in the constant value table 123. In addition, the time estimation unit 133 estimates the restoration period on the basis of the specified memory usage and the RAM read speed registered in the constant value table 123. Then, the time estimation process is completed.

(S57) The time estimation unit 133 determines whether the interruption method is the migration. If the interruption method is the migration, the process proceeds to step S58; otherwise (if the interruption method is the checkpoint restart), the process proceeds to step S59.

(S58) The time estimation unit 133 estimates the transfer period by substituting the specified memory usage and the plurality of specified index values, the ideal bandwidth registered in the constant value table 123, and the coefficients A, B, C, D, and E registered in the coefficient table 125 into the estimation equation. Then, the time estimation unit 133 estimates the migration period on the basis of the specified memory usage, the RAM read speed and RAM write speed registered in the constant value table 123, and the estimated transfer period. Then, the time estimation process is completed.

(S59) The time estimation unit 133 estimates the saving period on the basis of the specified memory usage and the HDD write speed registered in the constant value table 123.

(S60) The time estimation unit 133 determines whether the restart nodes are the same as the currently used computing nodes, that is, whether the interruption method is the checkpoint restart (restart on the same nodes). If the interruption method is the checkpoint restart (restart on the same nodes), the process proceeds to step S61. If the interruption method is the checkpoint restart (restart on different nodes), the process proceeds to step S62.

(S61) The time estimation unit 133 estimates the restoration period on the basis of the specified memory usage and the HDD read speed registered in the constant value table 123.

(S62) The time estimation unit 133 estimates the transfer period by substituting the specified memory usage and the plurality of specified index values, the ideal bandwidth registered in the constant value table 123, and the coefficients A, B, C, D, and E registered in the coefficient table 125 into the estimation equation. Then, the time estimation unit 133 estimates the restoration period on the basis of the specified memory usage, the HDD read speed and RAM write speed registered in the constant value table 123, and the estimated transfer period.

The above case is that the regression analysis is performed to update the coefficients A, B, C, D, and E each time one job interruption schedule is determined. Alternatively, the regression analysis may be performed in a batch way after a specified amount of information is accumulated in the regression analysis table 124.

For example, the feedback unit 134 may be designed to monitor registration of a combination (entry) of index values, memory usage, and transfer period to the regression analysis table 124, and when a predetermined number of entries are accumulated, start the regression analysis. In this case, the feedback unit 134 may delete entries used for the regression analysis from the regression analysis table 124. This makes it possible to adjust intervals for performing the regression analysis, and reduce the load imposed on the management node 100.

In the parallel computing system of the second embodiment, when a job interruption schedule is determined, relay nodes that relay data on a job is determined, and a plurality of index values that have an effect on a transfer period, such as the use state of the relay nodes, are calculated. Then, the transfer period is estimated using the plurality of calculated index values and the plurality of coefficients that give weights to these index values. This approach makes it possible to improve the accuracy in the estimation of transfer period, compared with the case of estimating the transfer period based only on static information such as hardware performance. In addition, when data transfer is complete, an actual transfer period is fed back, and regression analysis is performed using the actual transfer period and the plurality of index values used for the estimation, and thereby the plurality of coefficients that are used for the estimation are updated. This approach makes it possible to further improve the accuracy in the estimation of transfer period.

As a result, it is possible to calculate a continuous available execution period that is available after a data transfer, with high accuracy. Therefore, it becomes easy to perform job scheduling such as to avoid frequent interruptions of jobs and to increase the actual efficiency of the use of nodes.

(Third Embodiment)

A third embodiment will now be described. Differential features from the second embodiment will mainly be described, and the same features as the second embodiment will not be described.

A parallel computing system of the third embodiment employs a different method of measuring an actual transfer period from that of the second embodiment. The parallel computing system of the third embodiment is implemented with the same configuration of that of the second embodiment illustrated in FIGS. 2, 3, and 10. The following describes the third embodiment using reference numerals used in FIGS. 2, 3, and 10.

Figure 17:
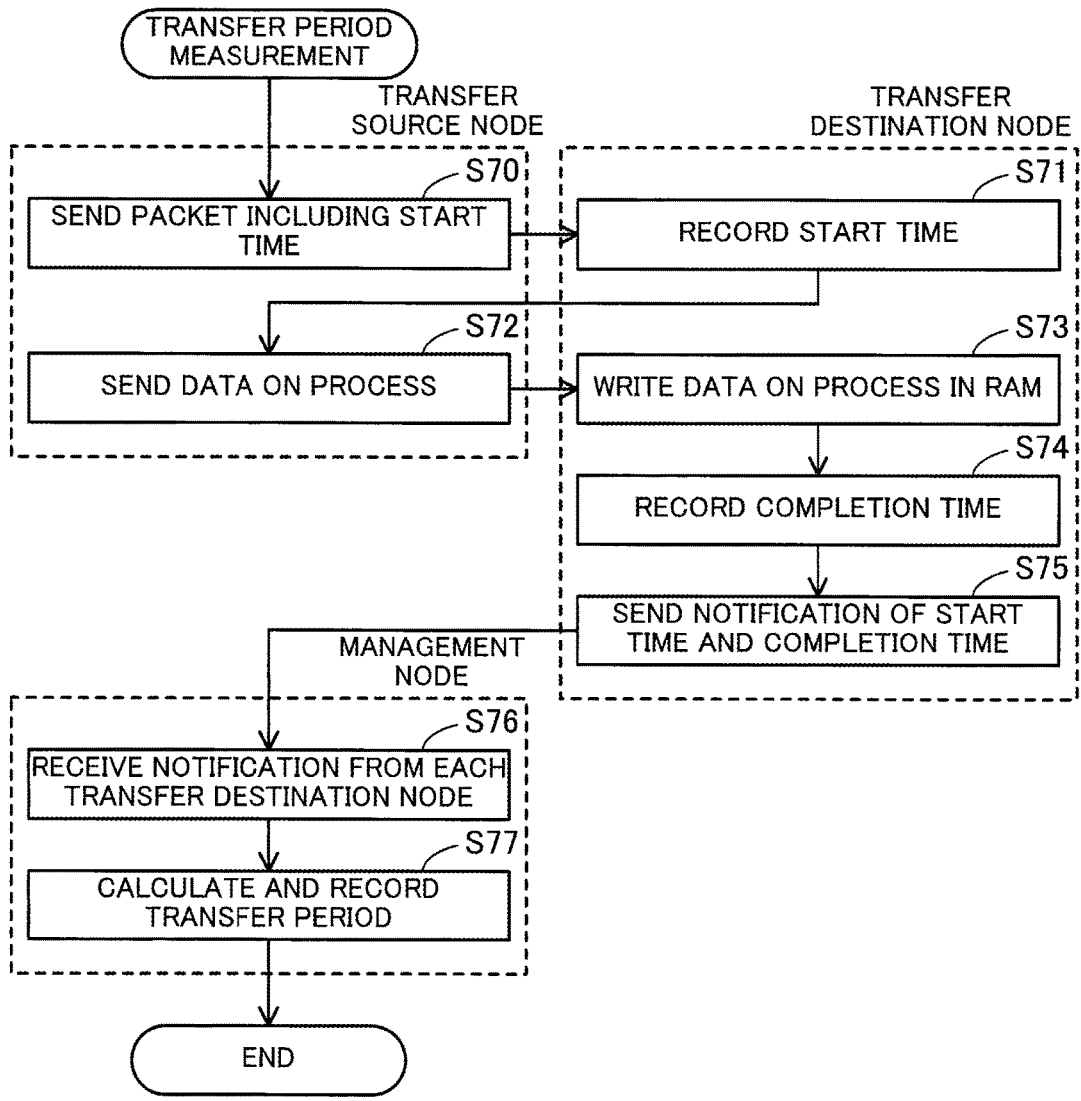
FIG. 17 is a flowchart illustrating an exemplary procedure for transfer period measurement.

FIG. 17 is a flowchart illustrating an exemplary procedure for transfer period measurement.

(S70) A job interruption unit of a transfer source node receives a restoration notification in the checkpoint restart (restart on different nodes) or a migration notification from a management node 100. Then, the job interruption unit of the transfer source node sends a packet indicating the current time (start time) to a transfer destination node. The transfer destination node is specified by the management node 100.

(S71) A job interruption unit of the transfer destination node records the start time indicated by the packet received from the transfer source node, in a RAM or HDD.

(S72) The job interruption unit of the transfer source node reads data on a process belonging to a target job from a RAM and sends the data to the transfer destination node.

(S73) The job interruption unit of the transfer destination node receives the data on the process from the transfer source node, and writes the received data in the RAM.

(S74) When completing the receipt of all data on the process, the job interruption unit of the transfer destination node records the current time (completion time) in the RAM or HDD.

(S75) The job interruption unit of the transfer destination node notifies the management node 100 of the start time recorded at step S71 and the completion time recorded at step S74. The above steps S70 to 75 are executed for each combination of transfer source node and transfer destination node.

(S76) A scheduling unit 132 of the management node 100 receives a notification about the start time and completion time from each transfer destination node.

(S77) The scheduling unit 132 extracts the earliest start time from the obtained start times. The scheduling unit 132 also extracts the latest completion time from the obtained completion times. The scheduling unit 132 then subtracts the earliest start time from the latest completion time, that is, calculates a time period taken to transfer all data, as the transfer period, and records the transfer period in a regression analysis table 124.

The parallel computing system of the third embodiment is able to provide the same effects as the second embodiment. Further, in the third embodiment, the timestamp of data transfer start time is generated by a transfer source node, and the timestamp of data transfer completion time is generated by a transfer destination node. This makes it possible to improve the accuracy in the measurement of the actual transfer period. This leads to an improvement in the accuracy of regression analysis and to thereby further improve the accuracy in the estimation of transfer period.

In this connection, the information processing of the first embodiment is implemented by the parallel computing control apparatus 10 and nodes 21 to 26 executing programs. The information processing of the second and third embodiments is implemented by the computing nodes 1A to 9A, 1B to 9B, . . . , and 1F to 9F and the management node 100 executing programs.

Such a program may be recorded on a computer-readable recording medium (for example, recording medium 113). For example, recording media include magnetic disks, optical discs, magneto-optical discs, and semiconductor memories. Magnetic disks include FDs and HDDs. Optical discs include CDs, CD-Rs (Recordable), CD-RWs (Rewritable), DVDs, DVD-Rs, and DVD-RWs. The program may be recorded on a portable recording media that are then distributed. In such a case, the program may be copied from a portable recording medium to another recording medium (for example, HDD 103) and then executed.

According to one aspect, it becomes possible to perform job scheduling such as to improve the efficiency of the use of nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A parallel computing control apparatus comprising:
   a communication interface circuit which performs communication with a plurality of nodes over a network; and
   a processor configured to perform a procedure including:
   allocating one or more of the plurality of nodes to a first job,
   determining, among the plurality of nodes, a relay node located on a path from a first node to a second node, the first node being allocated to the first job until a first time point at which a second job is to run,
   obtaining an index value indicating usage of resources by other jobs executed in the relay node,
   estimating a transfer period taken to transfer data on the first job from the first node to the second node via the relay node, based on the index value and a memory usage of the first job in the first node and further using a coefficient that gives a weight to the index value, the memory usage representing a size of a memory area used for executing the first job in the first node,
   estimating a migration period by adding up a memory read time in the first node, the estimated transfer period, and a memory write time in the second node,
   calculating an available execution period during which the second node is idle, the available execution period beginning at the first time point,
   scheduling a migration of the first job from the first node to the second node at a second time point that precedes the first time point by the estimated migration period and execution of the first job on the second node after the migration, when the available execution period is equal to or longer than a specified threshold or a remaining expected execution period of the first job that remains at the second time point,
   recording an actual transfer period of the data on the first job, the actual transfer period being measured when the data on the first job is transferred from the first node to the second node, and
   updating the coefficient, based on the actual transfer period that is measured and recorded, by analyzing a plurality of combinations of the index value, the memory usage in the first node, and the actual transfer period.

2. The parallel computing control apparatus according to claim 1, wherein one or both of a first index value and a second index value is used as the index value, the first index value indicating an execution state of another job running on the relay node, the second index value indicating a use state of a communication link.

3. The parallel computing control apparatus according to claim 1, further comprising determining to execute a checkpoint restart process for the first job, when the second node is busy at the first time point, wherein the checkpoint restart process saves data of the first job into a storage device of the first node before the first time point comes and transfers the saved data from the storage device to the second node via the relay node.

4. A parallel computing system comprising:
   a plurality of nodes connected over a network; and
   a control apparatus including a processor coupled to a memory, the processor being configured to perform a procedure including:
   allocating one or more of the plurality of nodes to a first job,
   determining, among the plurality of nodes, a relay node located on a path from a first node to a second node, the first node being allocated to the first job until a first time point at which a second job is to run,
   obtaining an index value indicating usage of resources by other jobs executed in the relay node,
   estimating a transfer period taken to transfer data on the first job from the first node to the second node via the relay node, based on the index value and a memory usage of the first job in the first node and further using a coefficient that gives a weight to the index value, the memory usage representing a size of a memory area used for executing the first job in the first node,
   estimating a migration period by adding up a memory read time in the first node, the estimated transfer period, and a memory write time in the second node,
   calculating an available execution period during which the second node is idle, the available execution period beginning at the first time point,
   scheduling a migration of the first job from the first node to the second node at a second time point that precedes the first time point by the estimated migration period and execution of the first job on the second node after the migration, when the available execution period is equal to or longer than a specified threshold or a remaining expected execution period of the first job that remains at the second time point,
   recording an actual transfer period of the data on the first job, the actual transfer period being measured when the data on the first job is transferred from the first node to the second node, and
   updating the coefficient, based on the actual transfer period that is measured and recorded, by analyzing a plurality of combinations of the index value, the memory usage in the first node, and the actual transfer period.

5. A non-transitory computer-readable storage medium storing a computer program that causes a computer to execute a process comprising:
   determining, among a plurality of nodes connected over a network, a relay node located on a path from a first node to a second node, the first node being allocated to a first job until a first time point at which a second job is to run;
   obtaining an index value indicating usage of resources by other jobs executed in the relay node;
   estimating a transfer period taken to transfer data on the first job from the first node to the second node via the relay node, based on the index value and a memory usage of the first job in the first node and further using a coefficient that gives a weight to the index value, the memory usage representing a size of a memory area used for executing the first job in the first node, estimating a migration period by adding up a memory read time in the first node, the estimated transfer period, and a memory write time in the second node;

calculating an available execution period during which the second node is idle, the available execution period beginning at the first time point;

scheduling a migration of the first job from the first node to the second node at a second time point that precedes the first time point by the estimated migration period and execution of the first job on the second node after the migration, when the available execution period is equal to or longer than a specified threshold or a remaining expected execution period of the first job that remains at the second time point;

recording an actual transfer period of the data on the first job, the actual transfer period being measured when the data on the first job is transferred from the first node to the second node; and updating the coefficient, based on the actual transfer period that is measured and recorded, by analyzing a plurality of combinations of the index value, the memory usage in the first node, and the actual transfer period.

\* \* \* \* \*